United States Patent
Shimada et al.

[11] Patent Number: 5,910,829
[45] Date of Patent: Jun. 8, 1999

[54] LIQUID CRYSTAL DISPLAY DEVICE

[75] Inventors: Takayuki Shimada, Yamatokoriyama; Yuzuru Kanemori, Nara; Mikio Katayama, Ikoma; Shinya Tanaka, Sakai; Masumi Kubo, Nara, all of Japan

[73] Assignee: Sharp Kabushiki Kaisha, Osaka, Japan

[21] Appl. No.: 08/867,306

[22] Filed: Jun. 2, 1997

[30] Foreign Application Priority Data

Jun. 4, 1996 [JP] Japan .................................. 8-141986
Aug. 19, 1996 [JP] Japan .................................. 8-217530

[51] Int. Cl.⁶ ........................ G02F 1/1335; G02F 1/1333
[52] U.S. Cl. .......................................... 349/110; 349/106
[58] Field of Search .................................. 349/110, 111, 349/106

[56] References Cited

U.S. PATENT DOCUMENTS

| | | | |
|---|---|---|---|
| 5,142,392 | 8/1992 | Ueki et al. | 349/111 |
| 5,268,778 | 12/1993 | Shioji et al. | 349/110 |
| 5,585,951 | 12/1996 | Noda et al. | 349/122 |
| 5,614,290 | 3/1997 | Yamaguchi | 349/74 |
| 5,626,796 | 5/1997 | Tsujimura et al. | 349/106 |
| 5,636,042 | 6/1997 | Nakamura et al. | 349/106 |
| 5,641,974 | 6/1997 | den Boer et al. | 257/59 |

FOREIGN PATENT DOCUMENTS 3-2826   1/1991   Japan .
4-307521 10/1992  Japan .

*Primary Examiner*—Tiep H. Nguyen
*Attorney, Agent, or Firm*—David G. Conlin; George W. Neuner

[57] ABSTRACT

A liquid crystal display device includes: first and second substrates opposing each other; a liquid crystal layer interposed between the first and second substrates; a plurality of scanning lines and a plurality of signal lines formed on the first substrate so as to cross each other, the scanning lines and the signal lines defining a plurality of pixel regions arranged in a matrix; a plurality of switching elements each provided in one of the pixel regions in a vicinity of an intersection of the scanning lines and the signal lines; a color filter provided on the second substrate, the color filter including a plurality of colored portions; and a light blocking layer provided on the second substrate, the light blocking layer being formed of at least one of materials that are used for the plurality of colored portions.

31 Claims, 15 Drawing Sheets

FIG.2A

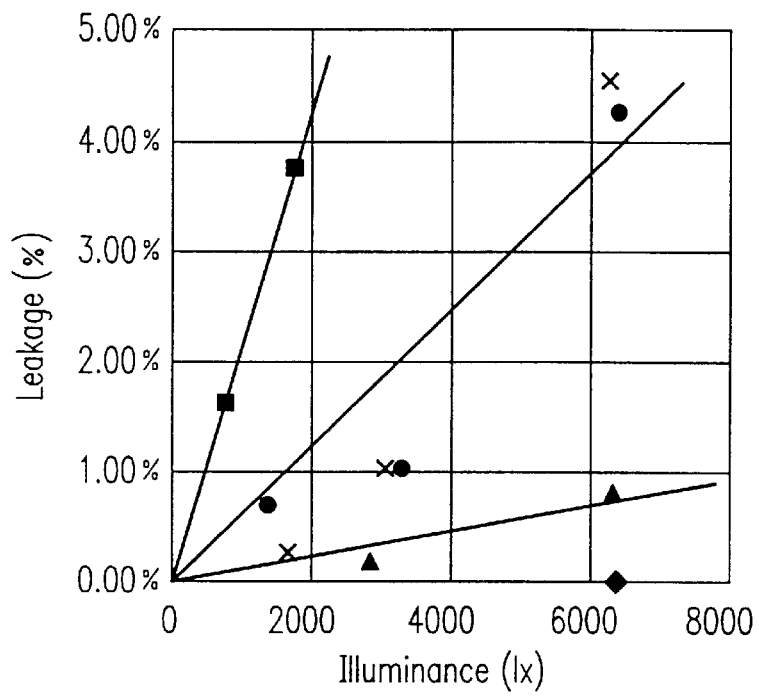

- ◆ Illumination from active matrix substrate side
- ■ Illumination from counter substrate side (no light blocking layer 35)
- ▲ Illumination from counter substrate side (light blocking layer 35-R colored portion)
- × Illumination from counter substrate side (light blocking layer 35-G colored portion)
- ● Illumination from counter substrate side (light blocking layer 35-B colored portion)

FIG.2B

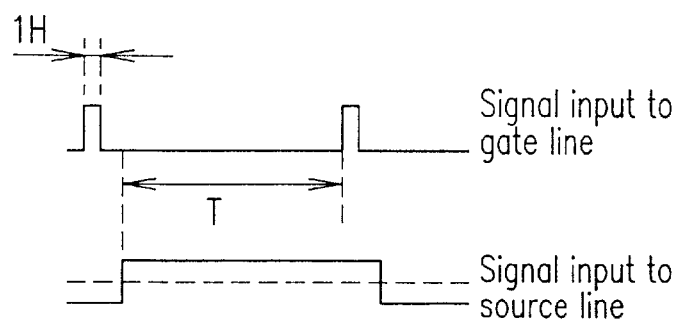

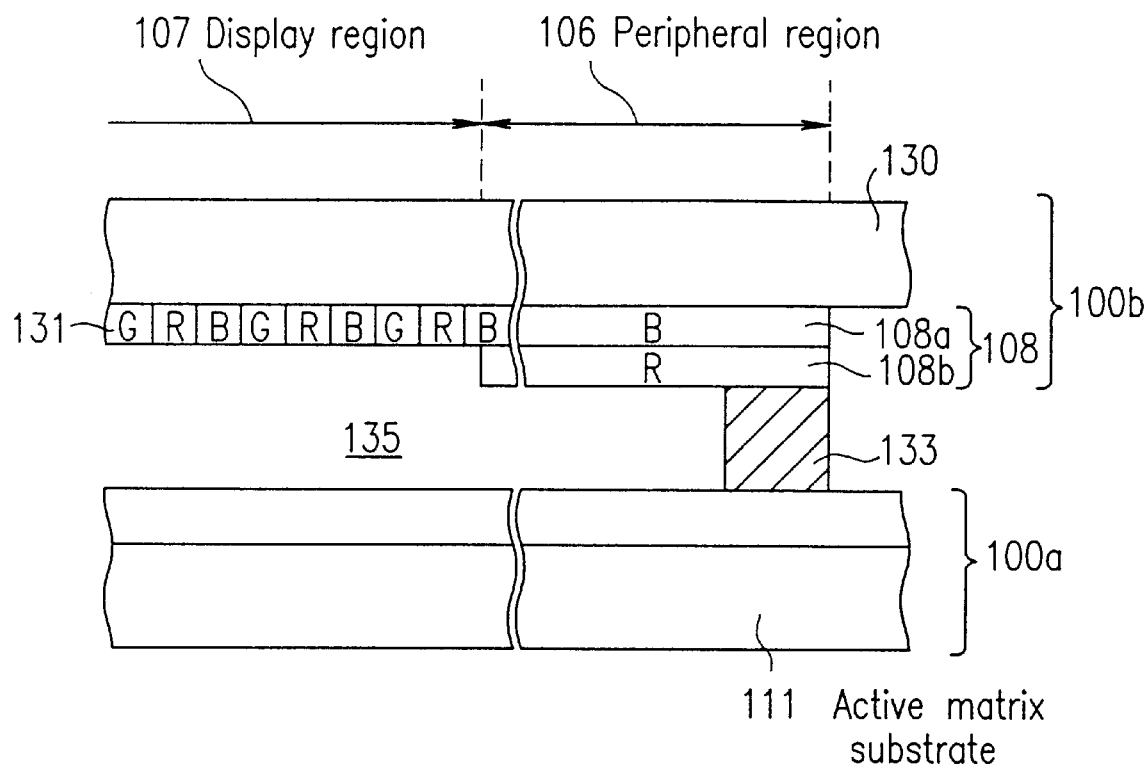

LIQUID CRYSTAL DISPLAY DEVICE

BACKGROUND OF THE INVENTION

1. Field of the Invention

The present invention relates to a liquid crystal display device which can be used as a display device in television sets, computers, word processors, OA (Office Automation) apparatuses, and the like.

2. Description of the Related Art

FIG. 20 shows an exemplary active matrix substrate of a liquid crystal display device.

The active matrix substrate includes thin film transistors (hereinafter referred to also as "TFTs") 2 as switching elements and pixel capacitors 1. The TFTs 2 and the pixel capacitors 1 are provided on the substrate so as to be arranged in a matrix. A gate electrode of the TFT 2 is connected to a gate line 3 as a scanning line, through which a scanning signal for driving the TFT 2 is input. A source electrode of the TFT 2 is connected to a source line 5 as a signal line, through which a video signal or the like as a display signal is input. The gate lines 3 and the source lines 5 are provided so as to cross each other. A drain electrode of the TFT 2 is connected to one terminal of a pixel electrode and to one terminal of the pixel capacitor 1. The other terminal of each pixel capacitor 1 is connected to a pixel capacitor line 4.

The active matrix substrate is attached to a counter substrate, on which a counter electrode is provided, with a liquid crystal layer interposed between the substrates, thereby forming a liquid crystal display device. The pixel capacitor line 4 is connected to the counter electrode on the counter substrate.

The most typical way to conduct a color display with such a liquid crystal display device is to provide a color filter on the counter substrate. The color filter includes a plurality of colored portions of three colors: R (Red), G (Green) and B (Blue). A counter substrate including such a color filter is called a "color filter substrate". Typically, a black matrix is provided on the color filter substrate to avoid a color mixture phenomenon or light leakage.

The black matrix is provided so as to cover boundaries between pixels, thereby blocking light leaking through the boundaries between pixels of the liquid crystal layer, across which no voltage is applied. The black matrix also covers the periphery of the display region, thereby also blocking light leaking through the peripheral region. Moreover, the black matrix is also present above the TFTs, thereby blocking ambient light which would otherwise be directly incident upon the TFTs and adversely affect the display characteristics of the device considerably.

FIG. 21 shows a configuration of a conventional liquid crystal display device. The conventional liquid crystal display device includes the active matrix substrate 10a having a configuration as shown in FIG. 20. The active matrix substrate 10a is attached to the color filter substrate 10b, on which the black matrix 6 is provided. The liquid crystal display device is provided with the pixel electrodes (not shown) formed in the display region 7 on the active matrix substrate 10a. The gate lines 3 and the source lines 5 are provided on the active matrix substrate 10a so that they run in the vicinity of the pixel electrodes while crossing each other. The lines 3 and 5 both extend outwardly beyond the peripheral region 8 to respective input terminals 3a and 5a which are provided in a terminal region 9 outside the peripheral region 8. The scanning signal is input to the gate lines 3 via the input terminal 3a, and the video signal is input to the source lines 5 via the input terminal 5a. On the other side, the color filter (not shown) is provided in the display region 7 on the color filter substrate 10b so as to face the pixel electrodes on the active matrix substrate 10a. The black matrix 6 is provided so as to cover the peripheral region 8, where the color filter is not present, thereby blocking light leaking through the peripheral region 8. It should be noted that, although the black matrix is also provided in the display region 7 as described above, it is not shown in FIG. 21.

As described above, in the conventional liquid crystal display device, the color filter substrate 10b is provided with the black matrix 6 as well as the color filter which includes the colored portions of three colors: R, G and B. The black matrix 6 is usually formed by patterning a metal layer. Eliminating the formation process for the black matrix 6 is a very effective way to reduce the manufacturing cost of the liquid crystal display device. Accordingly, there has been a demand for developing a liquid crystal display device in which the black matrix 6 does not have to be provided on the color filter substrate 10b. In such a case, however, it is necessary to ensure that ambient light does not considerably influence the display characteristics even if the black matrix 6 is not provided on the color filter substrate 10b. Moreover, it is also necessary to block light leaking through the peripheral region or through the portions of the liquid crystal layer corresponding to the boundaries between pixels, across which no voltage is applied. For example, leakage of light from a backlight through the peripheral region detracts from display quality, and is particularly problematic when conducting a black display. Therefore, it is necessary to block light from the backlight. Furthermore, a viewer usually views the liquid crystal display device from the color filter substrate side. When a sealing resin or the like, used in the peripheral region for the attachment of the substrates, is visible to the viewer, the display quality is detracted. Therefore, it is desirable to make the sealing resin or the like invisible from the viewer.

SUMMARY OF THE INVENTION

According to one aspect of this invention, a liquid crystal display device includes: first and second substrates opposing each other; a liquid crystal layer interposed between the first and second substrates; a plurality of scanning lines and a plurality of signal lines formed on the first substrate so as to cross each other, the scanning lines and the signal lines defining a plurality of pixel regions arranged in a matrix; a plurality of switching elements each provided in one of the pixel regions in a vicinity of an intersection of the scanning lines and the signal lines; a color filter provided on the second substrate, the color filter including a plurality of colored portions; and a light blocking layer provided on the second substrate, the light blocking layer being formed of at least one of materials that are used for the plurality of colored portions.

In one embodiment of the invention, each of the pixel regions corresponds to one of the plurality of colored portions. The light blocking layer is provided so as to face the switching element in each of the pixel regions. In a remaining portion of each of the pixel regions, a corresponding one of the colored portions is provided.

In another embodiment of the invention, the color filter includes red, blue and green colored portions. The light blocking layer is formed of a material that is used for the red colored portions.

In still another embodiment of the invention, the light blocking layer is formed in a peripheral region surrounding a display region which includes the plurality of pixel regions.

In still another embodiment of the invention, the light blocking layer is formed by depositing two layers respectively using two of the materials used for the plurality of colored portions of the color filter.

In still another embodiment of the invention, the light blocking layer includes the plurality of colored portions arranged to be next to one another in a single plane in the peripheral region, the plurality of colored portions being extended from the display region to the peripheral region.

In still another embodiment of the invention, each of the plurality of colored portions is narrower in the peripheral region than in the display region.

In still another embodiment of the invention, the liquid crystal display device further includes a second light blocking layer formed in the peripheral region. The second light blocking layer is provided so as to cover a region between any two adjoining scanning lines.

In still another embodiment of the invention, the second light blocking layer and the signal lines are formed by patterning one layer.

In still another embodiment of the invention, the liquid crystal display device further includes a second light blocking layer formed in the peripheral region. The second light blocking layer is provided so as to cover a region between any two adjoining signal lines.

In still another embodiment of the invention, the second light blocking layer and the scanning lines are formed by patterning one layer.

In still another embodiment of the invention, the liquid crystal display device further includes a second light blocking layer formed in the peripheral region. The second light blocking layer is provided so as to be spaced apart from an outermost one of the scanning lines. The light blocking layer is provided in a region corresponding to an interspace between the second light blocking layer and the outermost scanning line.

In still another embodiment of the invention, the liquid crystal display device further includes a second light blocking layer formed in the peripheral region. The second light blocking layer is provided so as to be spaced apart from an outermost one of the signal lines. The light blocking layer is provided in a region corresponding to an interspace between the second light blocking layer and the outermost signal line.

In still another embodiment of the invention, an insulating film is provided on the first substrate so as to cover the scanning lines and the signal lines. A second light blocking layer is provided in a region corresponding to a peripheral region of the first substrate. The second light blocking layer covers two or more of the scanning lines and/or two or more of the signal lines. The second light blocking layer is provided over the lines to be covered via the insulating film therebetween.

In still another embodiment of the invention, each of the switching elements includes an amorphous silicon layer or a polycrystalline silicon layer.

In still another embodiment of the invention, each of the switching elements is a thin film transistor including a gate electrode, an insulating film formed on the gate electrode, and a semiconductor film formed on the insulating film so as to be located above the gate electrode. A portion of a corresponding scanning line functions as the gate electrode.

In still another embodiment of the invention, each of the switching elements is a thin film transistor including a gate electrode, an insulating film formed on the gate electrode, and a semiconductor film formed on the insulating film so as to be located above the gate electrode. A branching portion of a corresponding scanning line functions as the gate electrode.

In still another embodiment of the invention, the liquid crystal display device further includes an interlayer insulating film provided on the first substrate so as to cover the scanning lines, the signal lines and the switching elements, with a plurality of pixel electrodes being formed on the interlayer insulating film. The plurality of pixel electrodes are arranged to respectively correspond to the plurality of pixel regions, each pixel of the electrodes being connected to the switching element formed in corresponding one of the pixel regions via a contact hole provided in the interlayer insulating film.

Hereinafter, the function of the present invention will be described.

According to the present invention, the light blocking layer is provided on one substrate so as to cover the switching elements provided on the other substrate. The light blocking layer is formed of the material that is used for one of the colored portions of the color filter. The light blocking layer prevents ambient light from being directly incident upon the switching elements. Thus, there is no need of providing the black matrix for covering the switching elements.

Especially, when the light blocking layer is formed of the material that is used for the red portions of the color filter, the influence of ambient light is less than when the light blocking layer is formed of the material used for the blue or green colored portions.

The influence of ambient light incident upon the switching elements is particularly significant when an amorphous silicon or a polycrystalline silicon is used for a semiconductor layer of the switching element, or when the semiconductor layer is formed on a portion of the scanning line or at the diverging point thereof. In such a case, the use of the above-described light blocking layer provides a more efficient blocking of ambient light.

The pixel electrodes may be provided on an interlayer insulating film which covers the scanning lines, the signal lines and the switching elements. This allows for formation of the pixel electrode with some overlap with these lines. In such a case, light leaking through the boundaries between pixels, across which no voltage is applied, can be blocked by the lines. Thus, there is no need for providing the black matrix for covering the boundaries between pixels.

According to the present invention, light leaking through the peripheral region is blocked by the light blocking layer which is provided on the color filter substrate so as to correspond to the peripheral region. The light blocking layer may be formed as a single layer or as a multilayer structure including two layers of different colors. In the case of the single-layer light blocking layer, a test for a sealing resin provided in the peripheral region can be easily conducted, while disturbance in the orientation of the liquid crystal molecules can be suppressed. When the single-layer light blocking layer includes a plurality of colored portions of different colors, coloring of light through the light blocking layer can be prevented from occurring.

Moreover, the light transmission through the peripheral region is further lowered if a second light blocking layer is provided in the peripheral region on the active matrix substrate so as to at least partially cover intervals between adjoining scanning lines and/or intervals between adjoining signal lines.

The second light blocking layer does not make the production process any more complicated since it can be formed simultaneously with the scanning lines and/or the signal lines. In such a case, since the outer most scanning line and/or the outer most signal line located on the periphery of the display region is formed in the same layer as the second light blocking layer is formed, they should be separated from each other at the boundary between the display region and the peripheral region. The light leakage through the boundary can also be avoided by providing another light blocking layer using the material that is used for one of the R, G and B colored portions of the color filter.

The second light blocking layer may also be provided via the insulating film which covers the scanning lines and the signal lines. For example, in the case of a POP structure, which will be described later, by providing the second light blocking layer on a thick layer such as an interlayer insulating film, the capacitance between the second light blocking layer and the respective lines can be reduced. Moreover, by providing the second light blocking layer so as to cover two or more of the scanning lines and/or the signal lines, the line arrangement's pattern can be made unrecognizable.

For forming the light blocking layer as the multilayer structure including two layers of different colors, two of the materials used for the R, G and B colored portions of the color filter may be used. When the multilayer structure is formed of the materials that are respectively used for the red and blue colored portions, the light transmission through the peripheral region becomes lower than when using one of the other combinations (i.e., red and green, or blue and green). Moreover, such a multilayer structure may also be formed of materials that each absorb light in a wavelength range different from that of any of the materials used for the colored portions of the color filter. The light blocking layer is not limited to such a multilayer structure which includes two layers of different colors, but may also be a single-layer light blocking layer. The single-layer light blocking layer may be formed of one or more of the materials that are used for the colored portions of the color filter, or may be formed of other materials that each absorb light in a wavelength range different from that of any of the materials used for the colored portions of the color filter.

Thus, the invention described herein makes possible the advantages of: (1) providing a liquid crystal display device which sufficiently reduces the influence of ambient light on the display characteristics of the device; and (2) providing a liquid crystal display device which blocks light leaking through the boundaries between pixels within the display region or through the peripheral region without the need for providing a black matrix on the color filter substrate.

These and other advantages of the present invention will become apparent to those skilled in the art upon reading and understanding the following detailed description with reference to the accompanying figures.

BRIEF DESCRIPTION OF THE DRAWINGS

FIG. 2A is a graph illustrating the influence of light incident upon a liquid crystal display device on the display characteristics of the device.

FIG. 2B is a schematic diagram illustrating signals supplied to a liquid crystal display device.

FIG. 8 is a cross-sectional view illustrating the essential portion of the liquid crystal display device according to Example 3 of the present invention.

FIG. 9A shows a portion of a peripheral region in which gate lines are provided, whereas FIG. 9B shows a portion of the peripheral region in which source lines are provided.

FIG. 10A is a cross-sectional view taken along the line A–A' in FIG. 9A, whereas

FIG. 11A shows a portion of a peripheral region in which gate lines are provided, whereas FIG. 11B shows a portion of the peripheral region in which source lines are provided.

FIG. 12A is a cross-sectional view taken along the line C–C' in FIG. 11A, whereas

DESCRIPTION OF THE PREFERRED EMBODIMENTS

Hereinafter, the present invention will be described by way of illustrative examples with reference to the accompanying figures.

(EXAMPLE 1)

Figure 1:
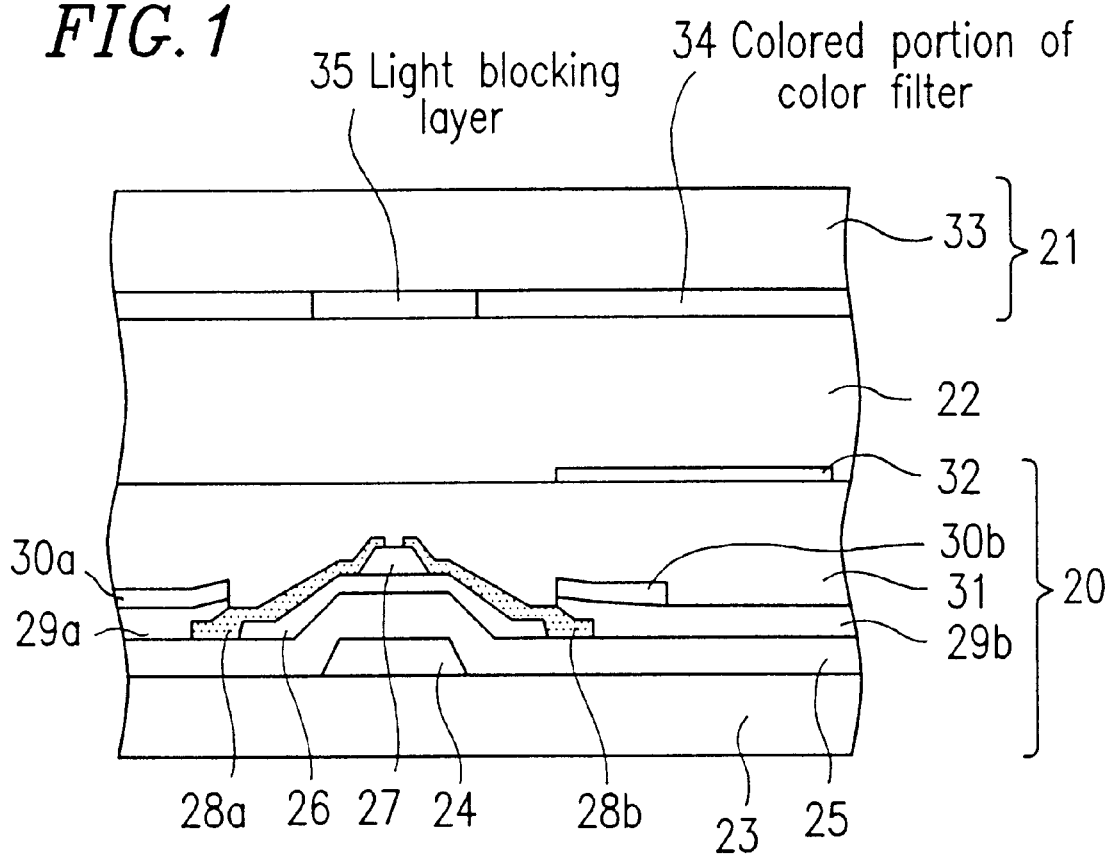
FIG. 1 is a cross-sectional view illustrating a liquid crystal display device according to Example 1 of the present invention.

FIG. 1 is a cross-sectional view illustrating a configuration of a liquid crystal display device according to Example 1 of the present invention.

The liquid crystal display device according to the present example includes an active matrix substrate 20 and a counter substrate 21 which are provided so as to oppose each other with a liquid crystal layer 22 interposed therebetween. The active matrix substrate 20 includes a transparent insulating substrate 23, on which a plurality of gate lines (not shown) and a plurality of source lines (not shown) are provided so as to cross each other. A pixel region corresponds to a region defined by adjoining two gate lines and adjoining two source lines. The display region of the active matrix substrate 20 includes a plurality of the pixel regions arranged in a matrix. A TFT as a switching element for driving the pixel is provided or in the vicinity of each intersection, where one gate line and one source line cross each other. For simplicity, FIG. 1 only shows a cross section of one pixel region.

Hereinafter, a configuration of one pixel will be described referring to FIG. 1. A gate electrode 24 of the TFT is provided on the substrate 23 so as to be connected to the gate line. A gate insulating film 25 is provided so as to cover the gate electrode 24 and the substrate 23. A semiconductor layer 26 is provided on the gate insulating film 25 so as to be located above the gate electrode 24. Moreover, a channel protective layer 27 is provided on a central area of the semiconductor layer 26. A pair of n$^+$-Si layers 28a and 28b which are to be a source electrode and a drain electrode of the TFT, respectively, are provided so as to cover end portions of the channel protective layer 27 and portions of the semiconductor layer 26. The n$^+$-Si layers 28a and 28b are spaced apart from each other on the channel protective layer 27. A transparent conductive layer 29a and a metal layer 30a are provided on the n$^+$-Si layer 28a, thereby forming a double-layered source line. A transparent conductive layer 29b and a metal layer 30b are provided on the other n$^+$-Si layer 28b. The transparent conductive layer 29b serves as a connection electrode for connecting a pixel electrode 32 to the drain electrode 28b.

Moreover, an interlayer insulating film 31 is formed so as to cover the TFT, the gate line and the source line. A transparent conductive layer to be the pixel electrode 32 is formed on the interlayer insulating film 31. The transparent conductive layer 29b as a connection electrode connects the pixel electrode 32 to the drain electrode 28b of the TFT via a contact hole (not shown) running through the interlayer insulating film 31. Furthermore, an alignment film (not shown) is provided on the active matrix substrate 20 so as to be in contact with the liquid crystal layer 22.

On the other hand, as shown in FIG. 1, the counter substrate 21 includes a transparent insulating substrate 33, on which a colored portion 34 of the color filter is provided so as to face the pixel electrode 32. The color of the colored portion 34 may be one of R, G and B according to the display color assigned to the particular pixel. In the conventional liquid crystal display device, the colored portion 34 of the color filter is provided so as to substantially cover the whole pixel region which substantially corresponds to the colored portion 34. On the contrary, in the liquid crystal display device according to the present example, the colored portion 34 is provided so as to cover the pixel region, but leaving uncovered a portion which faces the TFT. In this portion of the pixel region, which faces the TFT, a light blocking layer 35 is formed of one of the materials that are used for the R, G and B colored portions of the color filter.

Moreover, a counter electrode (not shown) is provided on the color filter and the light blocking layer 35. Furthermore, an alignment film (not shown) is also provided on the counter substrate 21 so as to be in contact with the liquid crystal layer 22.

Hereinafter, an exemplary method for producing the liquid crystal display device having such a configuration will be described.

First, the gate lines and the gate electrodes 24 to be connected to the gate lines are formed on the transparent insulating substrate 23. A glass substrate or the like may be used for the transparent insulating substrate 23. An anodized film may be optionally formed on the surface of the gate lines and the gate electrodes 24. A portion of the gate line may be used as the gate electrode 24. Alternatively, the branching portion of the gate line may be used as the gate electrode 24.

Next, the gate insulating film 25, the semiconductor layer 26, the channel protective layer 27, and the n$^+$-Si layers 28a and 28b (as the source and drain electrodes, respectively) are formed in this order. Any known method may be employed for forming these layers. Moreover, ITO layers (the transparent conductive layers) 29a and 29b, and the metal layers 30a and 30b are sequentially formed by sputtering or the like followed by a subsequent patterning process, thereby providing the source lines and the connection electrodes. The production processes so far have been conventionally known.

Then, the interlayer insulating film 31 is formed. In the present example, a photosensitive acrylic resin is spin-coated to be about 3 μm in thickness, and a contact hole is formed therethrough. Thereafter, a transparent conductive layer to be the pixel electrodes 32 is formed on the interlayer insulating film 31 and then patterned to achieve the desired pattern. In the present example, an ITO film is formed by sputtering. Thus, the pixel electrodes 32 are connected, via the contact hole running through the interlayer insulating film 31, to the transparent conductive layer 29b, which is connected to the drain electrode 28b of the TFT.

The counter substrate 21 is produced as follows. First, the colored portions 34 of the color filter and the light blocking layer 35 are formed so that the colored portions of the three colors and the light blocking layer are respectively arranged in a predetermined pattern. This can be accomplished by using any known method. All that is necessary is to form the light blocking layer 35 in the portion of each pixel region that faces the TFT thereof, while forming the colored portions 34 in the remaining portion of the pixel region. Subsequently, a transparent conductive layer is formed on the colored portions 34 and the light blocking layer 35, and then patterned in the predetermined pattern, thereby forming the counter electrodes (not shown). Note that either the active matrix substrate 20 or the counter substrate 21 may be produced first.

Then, alignment films are respectively formed on the active matrix substrate 20 and the counter substrate 21, after which the substrates 20 and 21 are attached together with a sealing member. Thereafter, a liquid crystal material is injected into the space between the substrates 20 and 21 so as to form the liquid crystal layer 22. Thus, the liquid crystal display device of Example 1 is produced.

In order to determine which one of the materials that are used for the colored portions 34 is the most preferable material for the light blocking layer 35, the inventors of the present invention evaluated the influence of light incident upon a liquid crystal display device on the display characteristics of the device. The results are shown in FIG. 2A. In particular, the evaluation was conducted with a liquid crystal display device having an n-type bottom-gate TFT, for the following five conditions: 1) illumination from the active matrix substrate side; 2) illumination from the counter substrate side with no light blocking layer 35; 3) illumination from the counter substrate side with the light blocking layer 35 being formed of the material that is used for the R colored portions; 4) illumination from the counter substrate side with the light blocking layer 35 being formed of the material that is used for the G colored portions; 5) illumination from the counter substrate side with the light blocking layer 35 being formed of the material that is used for the B colored portions. The TFT includes an amorphous silicon semiconductor layer formed on the gate electrode via the gate insulating film which is interposed therebetween. No channel protective layer is provided for the TFT. A channel protective layer is usually formed of $SiN_x$, which is transparent in the wavelength range of visible light. Therefore, the presence or absence of the channel protective layer is considered to have only little influence on changes in display characteristics due to illumination.

In FIG. 2A, leakage (%) shown along the vertical axis of the graph was determined as follows. Two signals respectively having waveforms as shown in FIG. 2B were supplied to the gate line and the source line, respectively, while the period T thereof is varied. The signal supplied to the source line corresponds to an image signal for the pixel. Under this condition, the relationship between the signal for the liquid crystal display device and the transmission thereof was studied. A shift between the signal supplied to the source line (i.e., the image signal to be applied to the pixel) and the signal which is actually applied to the pixel (i.e., the effective voltage applied to the liquid crystal layer), due to the off current of the TFTs, was observed for an intermediate gray-scale voltage in the case of using a typically-employed field frequency of about 60 Hz. The term "leakage (%)" used in this specification is defined as the ratio of the shift with respect to the image signal for the pixel.

As can be seen from FIG. 2A, when the liquid crystal display device is illuminated with light from the counter substrate 21 side, the leakage and the illumination vary in proportion to each other. This indicates that the off current of the TFT increases when the liquid crystal display device is illuminated with light. However, the leakage decreases when the light blocking layer 35 is formed of one of the materials that are used for the R, G and B colored portions 34 of the color filter. For example, the leakage is about 2.2% for the illuminance of about 1000 lx when the liquid crystal display device is not provided with the light blocking layer 35. For the same illuminance (about 1000 lx), the leakage is about 0.6% when the liquid crystal display device is provided with the light blocking layer 35 formed of the material that is used for the G or B colored portions, whereas the leakage is about 0.13% when the liquid crystal display device is provided with the light blocking layer 35 formed of the material that is used for the R colored portions.

Herein, when the electric characteristics of the TFT when the TFT is off are not satisfactory, problematic vertical crosstalk occurs in the display. In order to suppress the vertical crosstalk down to a non-problematic level, the leakage needs to be about 1% or less (more desirably, about 0.5% or less). Accordingly, it is understood that, when the light blocking layer 35 is not provided, the influence of light on the display characteristics of the liquid crystal display device is considerably large, whereby a satisfactory display cannot be realized. It is also understood that, when the light blocking layer 35 is formed of one of the materials that are used for the colored portions of the color filter (particularly that used for the R colored portions), there is provided an excellent effect of suppressing the influence of illumination on the off characteristic of the TFT.

Herein, under a typical work desk environment where a personal computer is used, the illuminance is about several hundred lx to about one thousand lx. When the light blocking layer 35 is formed of the material that is used for the B or G colored portions, the leakage is about 0.6% for the illuminance of about 1000 lx, whereby the production margin is slightly insufficient for mass production of the liquid crystal display device. However, when the light blocking layer 35 is formed of the material that is used for the R colored portions, no problem occurs even in some work environment where the illuminance is as high as about 5000 lx. Thus, a sufficiently large production margin can be realized.

In view of such results, the liquid crystal display device as shown in FIG. 1 was produced with the light blocking layer 35 being formed of the material that is used for the R colored portions. In such a liquid crystal display device, the influence of ambient light was little despite that there is no black matrix provided on the counter substrate, while very good display characteristics were also achieved.

(EXAMPLE 2)

Figure 3:
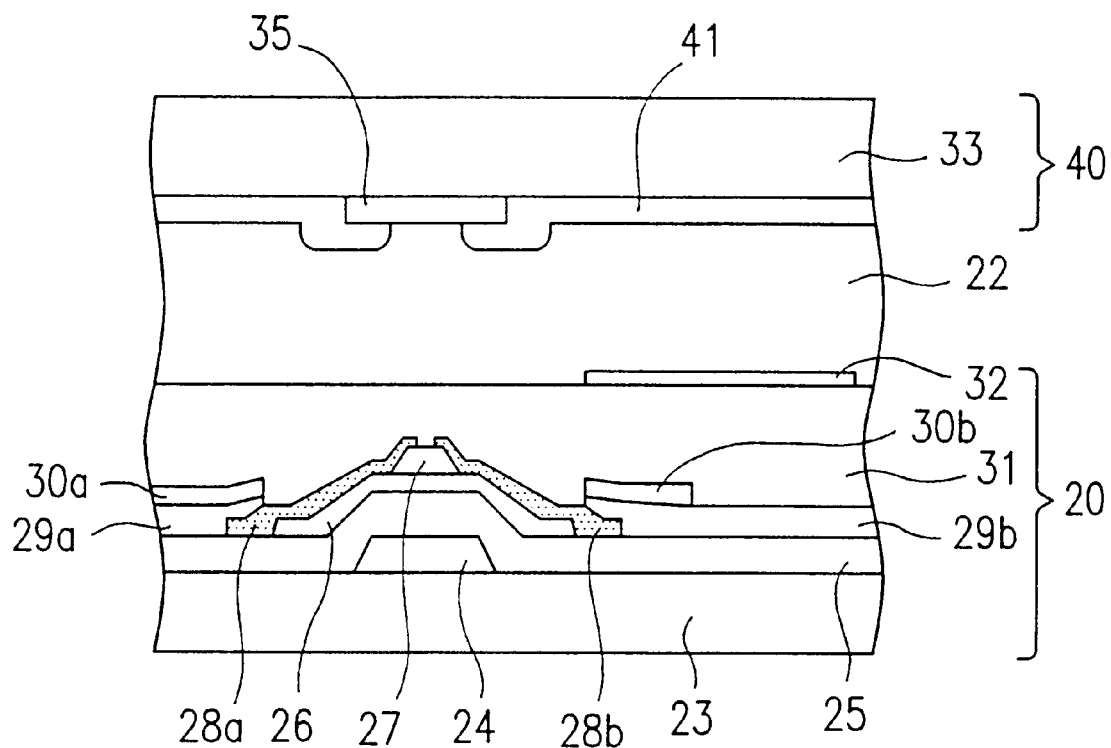
FIG. 3 is a cross-sectional view illustrating a liquid crystal display device according to Example 2 of the present invention.

FIG. 3 is a cross-sectional view illustrating a configuration of a liquid crystal display device according to Example 2 of the present invention.

As shown in FIG. 3, the colored portion 41 of the color filter is formed so as to partially overlap the light blocking layer 35. The light blocking layer 35 is formed of the material that is used for the R colored portions, while the color of each colored portion 41 is the display color of the corresponding pixel. Due to such a configuration, even if the light blocking layer 35 extends over the display region, the portion of the light blocking layer 35 present in the display region is prevented from influencing the chromaticity of the display.

With such a liquid crystal display device, the display quality can be improved, while, during the production, the attachment margin for the attachment of the active matrix substrate and the counter substrate can be made sufficiently large. Moreover, despite that the substrate becomes partially thick where the light blocking layer 35 overlaps the color filter 41, disturbance in the orientation of the liquid crystal molecules due to the thickness variation is hardly observed.

Figure 4:
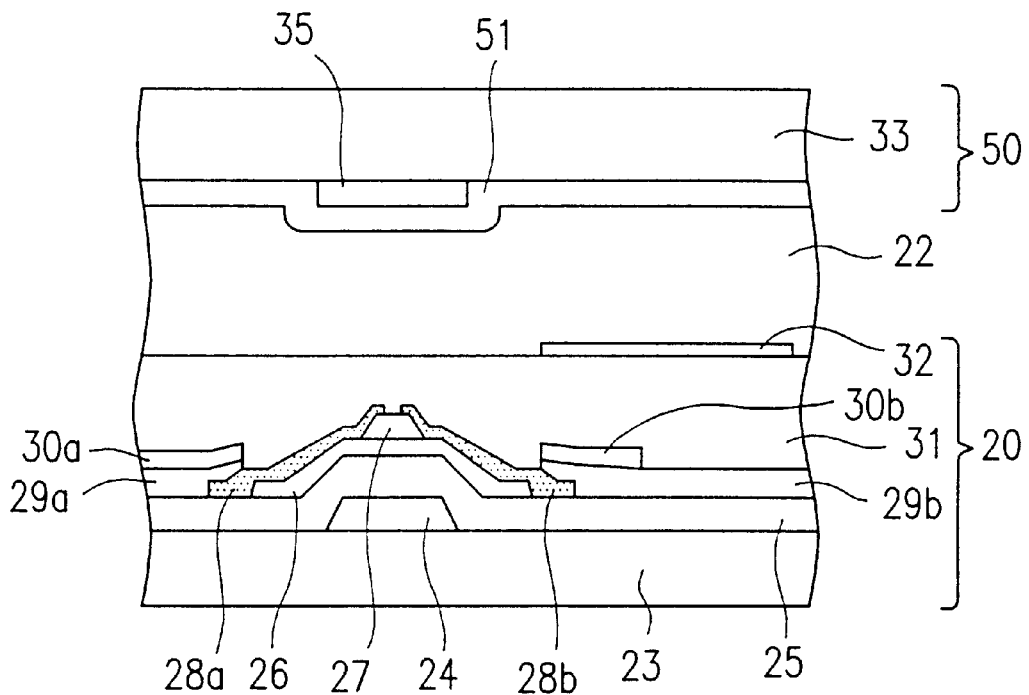
FIG. 4 is a cross-sectional view illustrating a configuration of a variation of Example 2 of the present invention.
Figure 5:
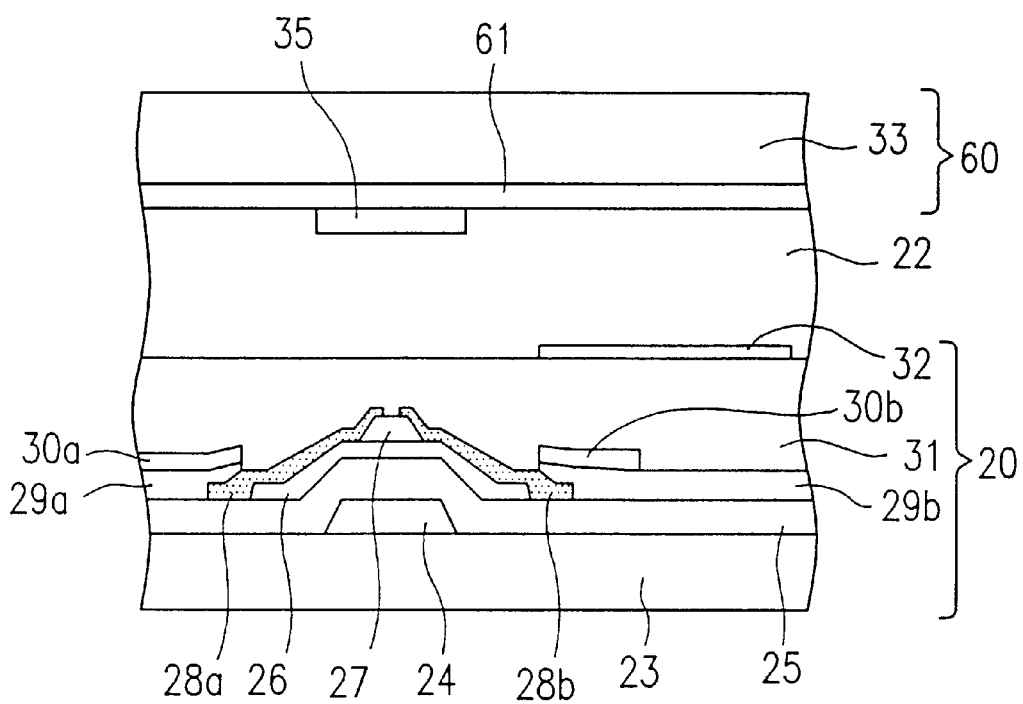
FIG. 5 is a cross-sectional view illustrating a configuration of another variation of Example 2 of the present invention.

Each of FIGS. 4 and 5 is a cross-sectional view illustrating a liquid crystal display device of a variation of Example 2. In the liquid crystal display device illustrated in FIG. 4, the light blocking layer 35 formed of the material that is used for the R colored portions is provided, in an island-like arrangement, in the colored portion 51 which corresponds to the G or B pixel. On the other hand, in the liquid crystal display device illustrated in FIG. 5, the light blocking layer 35 formed of the material that is used for the B or G colored portions is provided, in an island-like arrangement, on the colored portion 61, which corresponds to the R pixel.

In either case, since the double-layered structure is located above the TFT, the transmission itself decreases down to about several percent. Moreover, since one of the two layers in the double-layered structure is formed of the material that is used for the R colored portions, the increase in the off current due to light passing through the device can be further reduced.

Moreover, the present invention may similarly applied to a liquid crystal display device having an NMOS transistor in place of the TFT. In such a case, the off current for red light is small even when the semiconductor layer is formed of a polycrystalline Si and has a carrier mobility of about 100 cm$^2$/V·S.

Furthermore, the present invention is not limited to any of the configurations described above. For example, although, in the above description, the source line is a double-layered structure including the metal layer and the ITO layer, the source line may also be formed in a single-layer structure. Note, however, that the double-layered source line is advantageous in that disconnection occurs less frequently since, even when there is some defect in a portion of the metal layer, electrical connection is maintained owing to the ITO layer. Moreover, although, in the above description, the pixel electrode is provided on the interlayer insulating film which covers the gate lines, the source lines and the TFTs, it is also possible to provide the pixel electrode so as to be partially on the drain electrode of the TFT without providing the interlayer insulating film. Note, however, when the pixel electrode is provided on the interlayer insulating film, the pixel electrode may overlap with the lines, so that a voltage is applied across a portion of the liquid crystal layer where the pixel electrode is provided, while light leaking through the boundaries between pixels, across which no voltage is applied, can be blocked by the lines. Therefore, there is no need for providing the black matrix for covering the boundaries between pixels. In fact, formation of the black matrix may be completely eliminated.

Still furthermore, although an active matrix type liquid crystal display device which employs TFTs as switching elements has been described above, it is also possible to apply the present invention to other liquid crystal display devices which employ other types of switching elements (e.g., MIM (Metal Insulator Metal) elements).

(EXAMPLE 3)

Figure 6:
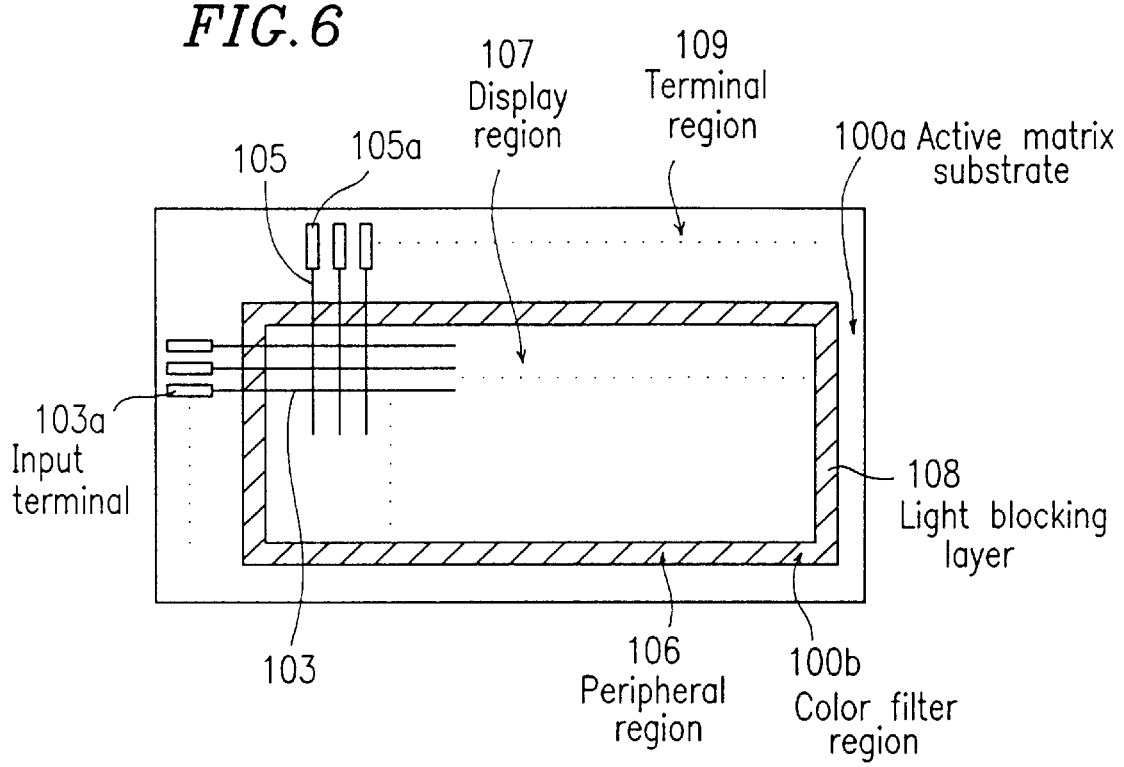
FIG. 6 is a plan view illustrating a liquid crystal display device according to Example 3 of the present invention.

FIG. 6 is a plan view illustrating a liquid crystal display device according to Example 3 of the present invention.

The liquid crystal display device of Example 3 includes an active matrix substrate 100a provided with pixel electrodes 120 (FIG. 7) and a color filter substrate 100b provided with counter electrodes (not shown). The substrates 100a and 100b oppose each other with a liquid crystal layer 135 (FIG. 8) interposed therebetween. A pixel region is defined by adjoining two gate lines and adjoining two source lines, while a display region 107 is defined as a region where a plurality of pixel regions are arranged. A peripheral region 106 is defined around the periphery of the display region 107.

The active matrix substrate 100a includes gate lines 103 as scanning lines and source lines 105 as signal lines. The gate lines 103 and the source lines 105 are provided so that they run in the vicinity of the pixel electrodes 120 while crossing each other. The lines 103 and 105 both extend outwardly beyond the peripheral region 106 to respective input terminals 103a and 105a which are provided in a terminal region 109 outside the peripheral region 106. A scanning voltage is input to the gate lines 103 via the input terminal 103a, and a signal voltage is input to the source lines 105 via the input terminal 105a.

Figure 7:
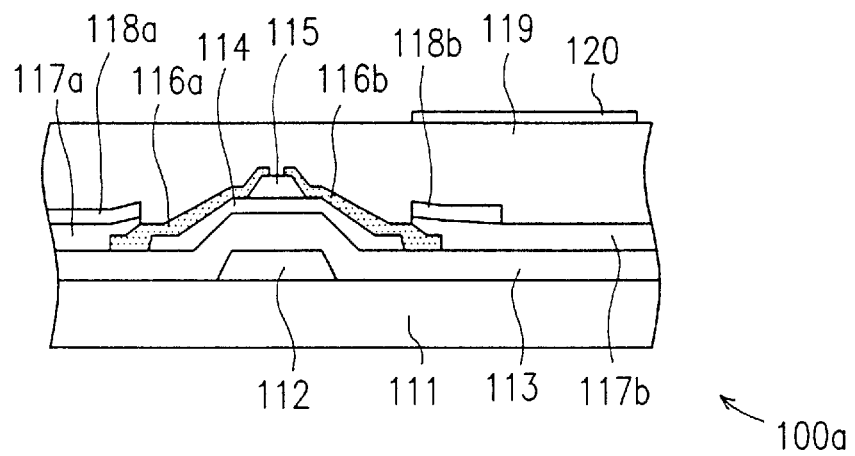
FIG. 7 is a cross-sectional view illustrating a TFT provided on an active matrix substrate of the liquid crystal display device according to Example 3 of the present invention.

FIG. 7 is a cross-sectional view illustrating one of TFTs provided on the active matrix substrate 100a.

The active matrix substrate 110a includes a transparent insulating substrate 111, on which a gate electrode 112 is provided so as to be connected to a gate line 103. A gate insulating film 113 is provided so as to cover the gate electrode 112 and the substrate 110a. A semiconductor layer 114 is provided on the gate insulating film 113 so as to be superimposed over the gate electrode 112. Moreover, a channel protective layer 115 is provided on a central area of the semiconductor layer 114. A pair of n$^+$-Si layers 116a and 116b which are to be a source electrode and a drain electrode of the TFT, respectively, are provided so as to cover end portions of the channel protective layer 115 and portions of the semiconductor layer 114. The n$^+$-Si layers 116a and 116b are spaced apart from each other on the channel protective layer 115.

A transparent conductive layer 117a and a metal layer 118a are provided on the n$^+$-Si layer 116a, thereby forming a double-layered source line 105. A transparent conductive layer 117b and a metal layer 118b are provided on the other n$^+$-Si layer 116b. The transparent conductive layer 117b serves as a connection electrode which connects the pixel electrode 120 to the drain electrode 116b. Moreover, an interlayer insulating film 119 is provided so as to cover the TFT, the gate line 103 and the double-layered source line 105. The pixel electrode 120 is formed of a transparent conductive layer on the interlayer insulating film 119. The transparent conductive layer 117b as a connection electrode connects the pixel electrode 120 to the drain electrode 116b of the TFT via a contact hole running through the interlayer insulating film 119 (not shown in the figure). The contact hole will be further described later.

FIG. 8 is a cross-sectional view illustrating the above-described active matrix substrate 100a and the color filter substrate 100b, which oppose each other with the liquid crystal layer 135 interposed therebetween. In the color filter substrate 100b, a color filter 131 is provided within the display region on a transparent insulating substrate 130 as a base substrate. One of the R, G and B colored portions of the color filter 131 is provided for each pixel according to the display color of the pixel. Moreover, a light blocking layer 108 is provided in the peripheral region 106 of the color filter substrate 100b. The light blocking layer 108 is formed as a multilayer structure including two layers of different colors (e.g., blue and red as in this illustrated example). A sealing member 133, which is made of a sealing resin or the like, is provided at the end of the light blocking layer 108 for attaching the active matrix substrate 100a to the color filter substrate 100b.

The liquid crystal display device of the present example may be produced, for example, as follows.

In order to produce the active matrix substrate 100a, first, gate lines 103 and the gate electrodes 112 are formed on the transparent insulating substrate 111. A glass substrate or the like may be used for the transparent insulating substrate 111. An anodized film may be optionally formed on the surface of the gate lines 103 and the gate electrodes 112. A portion of the gate line may be used as the gate electrode 112. Alternatively, the branching portion of the gate line may be used as the gate electrode 112.

Next, the gate insulating film 113, the semiconductor layer 114, the channel protective layer 115, and the n$^+$-Si layers 116a and 116b (as the source and drain electrodes, respectively) are formed in this order. Moreover, ITO layers (the transparent conductive layers) 117a and 117b, and the metal layers 118a and 118b, are sequentially formed by sputtering or the like followed by a subsequent patterning process, thereby providing the double-layered source lines 105 and the connection electrodes. The production processes so far have been conventionally known.

Then, the interlayer insulating film 119 is formed by spin-coating a photosensitive acrylic resin to be about 3 μm in thickness, and a contact hole is formed therethrough. Thereafter, a transparent conductive layer is formed on the interlayer insulating film 119 and then patterned to obtain the pixel electrodes 120. The pixel electrode 120 is connected, via the contact hole running through the interlayer insulating film 119, to the transparent conductive layer 117b, which is connected to the drain electrode 116b of the TFT. That is, the active matrix substrate 100a has a POP (Pixel On Passivation) structure.

Next, in order to produce the color filter substrate 100b, first, the colored portions of the color filter 131 and the light blocking layer 108 are formed on the transparent insulating substrate 130 so that the colored portions of the three colors of the color filter 131 and the light blocking layer 108 are respectively arranged in a predetermined pattern. The color filter 131 is formed by sequentially arranging the R, G and B colored portions according to the assigned color of the respective pixels. The light blocking layer 108 includes colored portions 108a and 108b and is formed by depositing two different ones (B and R in the present example) of the R, G and B colored portions. A transparent conductive layer is deposited on the color filter 131, thereby forming a counter electrode (not shown). Note that either the active matrix substrate 100a or the color filter substrate 100b may be produced first.

Then, alignment films (not shown) are respectively formed on the active matrix substrate 10a and the color filter substrate 100b, after which the substrates 100a and 100b are attached together with a sealing resin or the like. Finally, a liquid crystal material is injected into the space between the substrates 100a and 100b so as to form the liquid crystal layer 135. Thus, the liquid crystal display device of the Example 3 is produced.

In the liquid crystal display device of the present example thus produced, since the light blocking layer 108 is formed (by depositing two layers of different colors), light leaking through the peripheral region 106 can be blocked. Thus, light does not leak through the peripheral region 106 and, moreover, the sealing resin or the like, provided in the peripheral region 106, is invisible to the viewer. Particularly, when the light blocking layer 108 is formed of the materials that are respectively used for the red and blue colored portions, the light transmission through the peripheral region 106 can be lowered down to about 1%. In such a case, as can be naturally understood, the light transmission through the peripheral region 106 is lower than when no light blocking layer is provided or when a single-color light blocking layer is provided. Moreover, the light transmission through the peripheral region 106 is even lower than when the light blocking layer is formed of the materials of one of the other combinations of the R, G and B colored portions (i.e., R and G, or B and G). Furthermore, the light blocking layer 108 can be produced simultaneously during the patterning of the colored portions of the color filter 131. By doing so, the production process can be simplified.

(EXAMPLE 4)

Figure 9A:
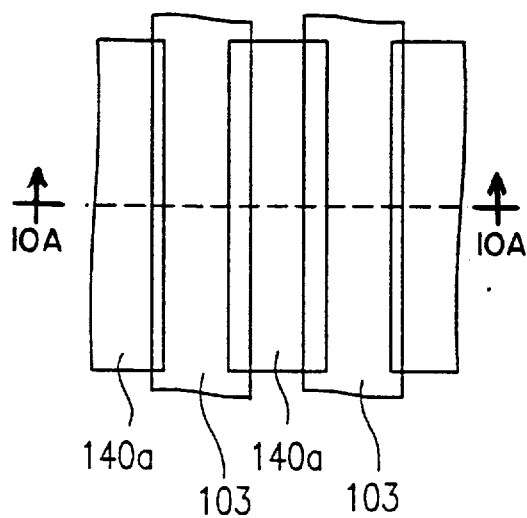
FIGS. 9A and 9B are plan views illustrating a portion of an active matrix substrate of a liquid crystal display device according to Example 4 of the present invention, where
Figure 9B:
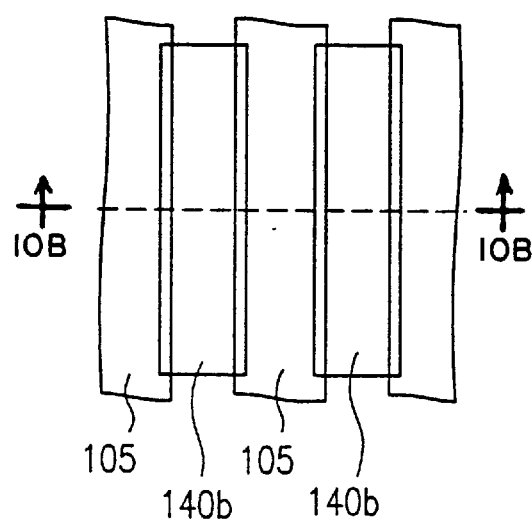
Figure 10A:
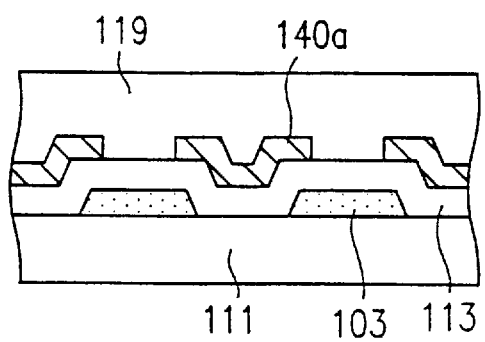
Figure 10B:
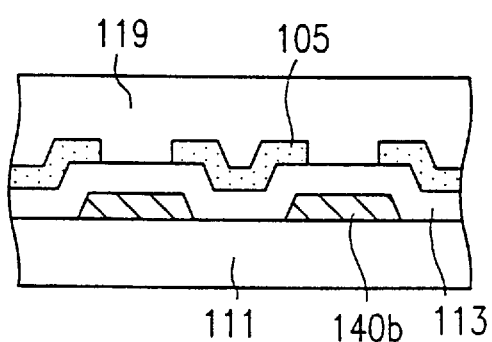
FIG. 10B is a cross-sectional view taken along the line B–B' in FIG. 9B.

FIGS. 9A and 9B are plan views illustrating a portion of an active matrix substrate of a liquid crystal display device according to Example 4 of the present invention. FIG. 10A is a cross-sectional view taken along the line A–A' in FIG. 9A, and FIG. 10B is a cross-sectional view taken along the line B–B' in FIG. 9B. FIGS. 9A and 10A show a portion of a peripheral region in which gate lines are provided. FIGS. 9B and 10B show a portion of a peripheral region in which source lines are provided.

In the active matrix substrate of the present example, a second light blocking layer 140a is formed in the peripheral region so as to cover intervals between adjoining gate lines 103, which have been already formed, while another second light blocking layer 140b is formed in the peripheral region so as to cover intervals between adjoining source lines 105, which have not been formed yet. As in Example 3, two layers of different colors are deposited in the peripheral region on the color filter substrate, thereby forming the light blocking layer.

The liquid crystal display device of Example 4 has advantages over that of Example 3 as follows. That is, in Example 3, the light transmission through the peripheral region 106 is about 1%, whereby the lines provided on the active matrix substrate can be seen through by the viewer. Therefore, it cannot be used in some applications, e.g., some personal computer applications where a particularly high display quality is required. On the contrary, the liquid crystal display device of Example 4 can be used in those applications since it includes the second light blocking layers 140a and 140b provided on the active matrix substrate, so that the light transmission through the peripheral region can be further lowered.

Moreover, the liquid crystal display device of Example 4 also has another advantage as follows. That is, the second light blocking layer 140a (which is formed in a region where the gate lines 103 are to be provided) and the source lines 105 can be formed simultaneously by patterning one layer; whereas the second light blocking layer 140b (which is formed in a region where the source lines 105 are to be provided) and the gate lines 103 can be formed simultaneously by patterning one layer. Alternatively, the second light blocking layer 140a and the source lines 105 may be formed by patterning two different layers; or the second light blocking layer 140b and the gate lines 103 may be formed by patterning two different layers. However, forming the second light blocking layer 140a and the source lines 105 by patterning one layer, while similarly forming the light blocking layer 140b and the gate lines 103 by patterning one layer is advantageous in terms of manufacturing cost since it does not provide any additional production step (e.g., deposition step for another layer and the patterning step therefor). In the case where the second light blocking layer 140b and the gate lines 103 are formed by patterning two different layers, the source lines 105 can be formed so that the second light blocking layer 140b overlaps the source lines 105.

Furthermore, the liquid crystal display device of example 4 also has yet another advantage as follows. When the second light blocking layer 140a (which is formed in the region where the gate lines 103 are to be provided) is formed by patterning the same layer as the source lines 105, since the interference in the layer located on the second light blocking layer 140a is different from that in the layer located on the gate lines 103, the pattern or arrangement of the lines provided in the peripheral region may be visible. The similar problem occurs when the second light blocking layer 140b (which is formed in the region where the source lines 105 are to be provided) is formed in the same layer as the gate lines 103. Moreover, there also occurs other problems that the sealing resin or the like (for the attachment of the active matrix substrate and the color filter substrate) or a conductive paste or the like (for allowing signal inputs to the counter substrate) provided in the peripheral region may be visible to the viewer. On the other hand, in the liquid crystal display device of Example 4, since the light blocking layer is provided in the peripheral region on the color filter substrate, the line arrangement, the sealing resin, the conductive paste and the like can be made invisible to the viewer, whereby a sufficient display quality is achieved.

In Example 4, the second light blocking layer 140a is formed in the region where the gate lines 103 are to be provided, while the second light blocking layer 140b is formed in the region where the source lines 105 are to be provided. However, the present invention may also be applied to the case where the second light blocking layer is provided only in the region where the gate or source lines are to be provided.

(EXAMPLE 5)

Figure 11A:
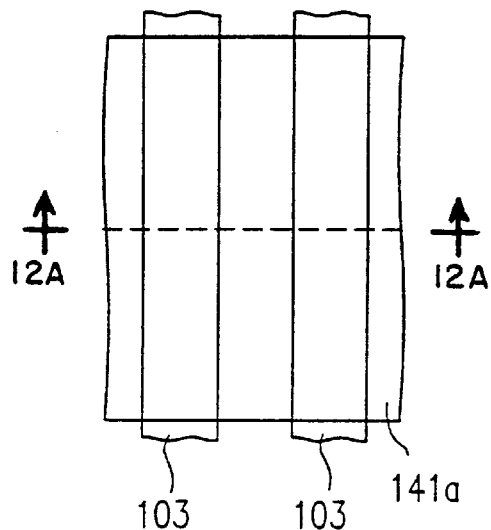
FIGS. 11A and 11B are plan views illustrating a portion of an active matrix substrate of a liquid crystal display device according to Example 5 of the present invention, where
Figure 11B:
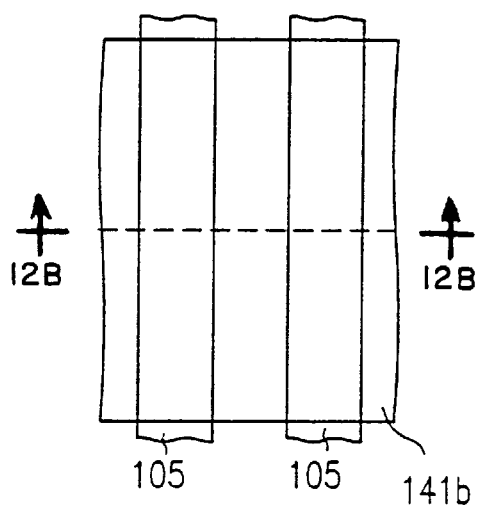
Figure 12A:
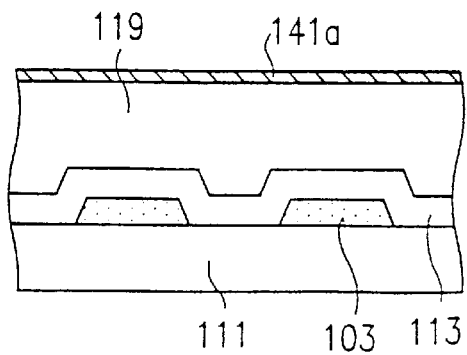
Figure 12B:
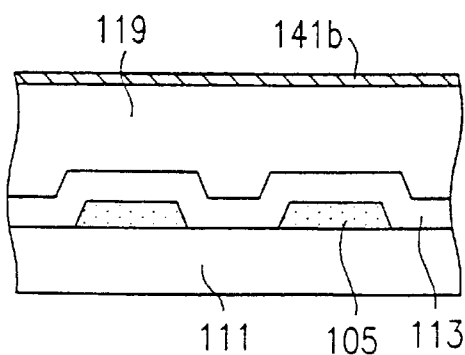
FIG. 12B is a cross-sectional view taken along the line D–D' in FIG. 11B.

FIGS. 11A and 11B are plan views illustrating a portion of an active matrix substrate of a liquid crystal display device according to Example 5 of the present invention. FIG. 12A is a cross-sectional view taken along the line C–C' in FIG. 11A, and FIG. 12B is a cross-sectional view taken along the line D–D' in FIG. 11B. FIGS. 11A and 12A show a portion of a peripheral region in which gate lines are provided. FIGS. 11B and 12B show a portion of a peripheral region in which source lines are provided.

In the active matrix substrate of the present example, a large island-like second light blocking layer 141a is formed in the peripheral region so as to cover the entire region where the gate lines 103 are provided, while another large island-like second light blocking layer 141b is formed in the peripheral region so as to cover the entire region where the source lines 105 are provided. As in the liquid crystal display device of Example 3, two layers of different colors are deposited on the color filter substrate, thereby forming the light blocking layer.

In the liquid crystal display device of Example 5, since the second light blocking layers 141a and 141b are provided on the active matrix substrate, the light transmission through the peripheral region can be further lowered. Therefore, as well as the liquid crystal display device of Example 4, the liquid crystal display device of Example 5 can also be used in applications where a particularly high display quality is required.

The second light blocking layers 141a and 141b are formed, for example, on the interlayer insulating film 119 which covers the gate lines 103 and the source lines 105. That is, each of the second light blocking layers 141a and 141b is formed in a layer which is different from the layer of the gate lines 103 or that of the source lines 105. In such a case, although the number of production steps to be performed increases compared to the liquid crystal display device of Example 4, the capacitance between the second light blocking layer 141a or 141b and the respective signal lines can be reduced due to the interlayer insulating film 119. Moreover, the second light blocking layers 141a and 141b are respectively formed to cover the gate lines 103 and the source lines 105. This, as in Example 4, makes the pattern or arrangement of the lines provided in the peripheral region invisible to the viewer.

As in Example 4, the liquid crystal display device of Example 5 includes the light blocking layer provided in the peripheral region on the color filter substrate. Therefore, the line arrangement, the sealing resin, the conductive paste and the like can be made invisible to the viewer, whereby a sufficient display quality is achieved.

In Example 5, the second light blocking layer 141a is formed in the region where the gate lines 103 are to be provided, while the second light blocking layer 141b is formed in the region where the source lines 105 are to be provided. However, the same effects as those described above can be realized also in the case where the second light blocking layer is provided only in the region where the gate or source lines are to be provided. Moreover, although the second light blocking layer 141a and 141b are formed in the large island-like shape so as to cover all of the gate and source lines 103 and 105, it is also applicable to form the second light blocking layer 141a and 141b so as to cover two or more of the gate lines and/or two or more of the source lines. Furthermore, as in Example 4, the large island-like second light blocking layers 141a and 141b can be formed simultaneously with the source lines 105 and the gate lines 103, respectively, whereby the production process can be facilitated. In such a case, although there occurs some problems such as a delay in signal transmission through the lines 103 and 105, the device can still be applied to applications where such a delay is acceptable.

(EXAMPLE 6)

Figure 13:
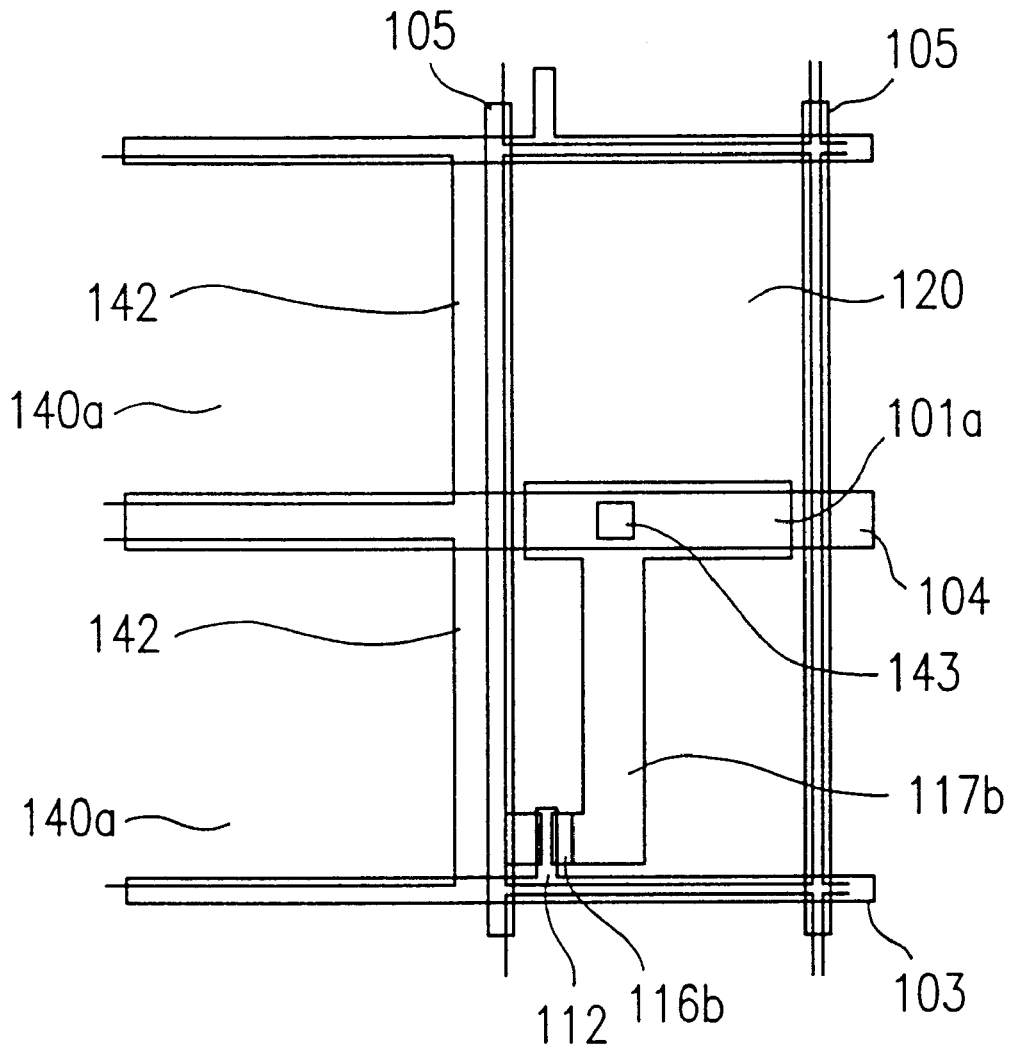
FIG. 13 is a plan view illustrating an active matrix substrate of a liquid crystal display device according to Example 6 of the present invention.

FIG. 13 is a plan view illustrating an active matrix substrate of a liquid crystal display device according to Example 6 of the present invention.

FIG. 13 shows one of the pixel regions in the outermost column of pixel regions arranged in a matrix in the display region. A TFT is formed in the pixel region. As the gate electrode of the TFT, the branching portion of the gate line 103 is used. The drain electrode 116b of the TFT is connected to the connection electrode 117b. The other terminal of the connection electrode 117b is connected to a pixel capacitor line 104. A contact hole 143 is provided above the pixel capacitor line 104. The pixel electrode and the connection electrode 117b are connected to each other via the contact hole 143.

In the peripheral region on the active matrix substrate, the second light blocking layer 140a is provided in a region where the gate lines 103 are to be provided. The second light blocking layer 140a is formed from the same layer as the source lines 105. The outermost source line 105 in the display region is spaced apart from the second light blocking layer 140a at the boundary between the display region and the peripheral region, thereby leaving an interspace 142 therebetween. Moreover, the light blocking layer 140a is not formed above the pixel capacitor line 104 extending to the peripheral region, thereby leaving the interspace 142 above the pixel capacitor line 104. Although not shown in the figure, the second light blocking layer 140b is provided in a region of the peripheral region where the source lines 105 are provided. The second light blocking layer 140b is formed from the same layer as the gate lines 103. The outermost gate line 103 in the display region is spaced apart from the second light blocking layer 140b at the boundary between the display region and the peripheral region, thereby similarly leaving an interspace therebetween. Another light blocking layer is formed in the peripheral region on the color filter substrate by depositing two layers of different colors so as to cover the interspace 142.

The liquid crystal display device of Example 6 has the following advantages over the liquid crystal display device of Example 4. That is, in the liquid crystal display device of Example 4, light may leak through the interspace 142 between the second light blocking layers (140a and 140b) and the signal lines (103 and 105). This creates the need for blocking light leaking through the boundary between the peripheral region and the display region. On the other hand, in the liquid crystal display device of Example 6, the light blocking layer is provided in the peripheral region on the color filter substrate so as to also cover the interspace 142, thereby blocking light leaking there-through. The width of the interspace 142 is no more than about several tens of micrometers. By providing the light blocking layer including two layers of different colors so as to cover the interspace 142, the transmission can be further reduced, whereby the display quality can be further improved to a satisfactory level.

In Example 6, the second light blocking layer 140*a* is formed in the region where the gate lines 103 are to be provided, while the second light blocking layer 140*b* is formed in the region where the source lines 105 are to be provided. However, the present invention may also be applied to the case where the second light blocking layer is provided only in the region where the gate or source lines are to be provided. Moreover, the present invention may also be applied to the case where only one of the multilayer light blocking layers is provided to cover the interspace 142.

Although the illustrative examples of the present invention have been described above, it should be noted that the present invention is not limited thereto. For example, in the above description, the light blocking layer is formed in the peripheral region on the color filter substrate by depositing the R and B colored portions. However, the present invention is not limited to such a combination, but also includes forming the light blocking layer by depositing the R and G (or R and G) colored portions. Still, it should be noted that, when the light blocking layer is formed by depositing the R and B colored portions, the light transmission may be made lower than when the light blocking layer is formed by depositing one of the other combinations of the R, G and B colored portions (i.e., R and G, or B and G). Moreover, the light blocking layer does not have to be formed of the materials used for the color portions of the color filter, but may also be formed of two materials that each absorb light in a wavelength range different from that of any of the materials used for the colored portions of the color filter.

Furthermore, in the above-described examples, the POP structure is employed, where the pixel electrodes are provided on the interlayer insulating film which covers the gate lines, the source lines and the TFTs. However, it is also possible to provide the pixel electrode so as to be partially on the drain electrode of the TFT without providing the interlayer insulating film. Still, when the pixel electrode is provided on the interlayer insulating film as in Example 6, the pixel electrode may overlap with the lines, so that a voltage is applied across a portion of the liquid crystal layer where the pixel electrode is provided, while light leaking through the boundaries between pixels, across which no voltage is applied, can be blocked by the lines. Therefore, there is no need for providing the black matrix even in the display region.

(EXAMPLE 7)

Figure 14:
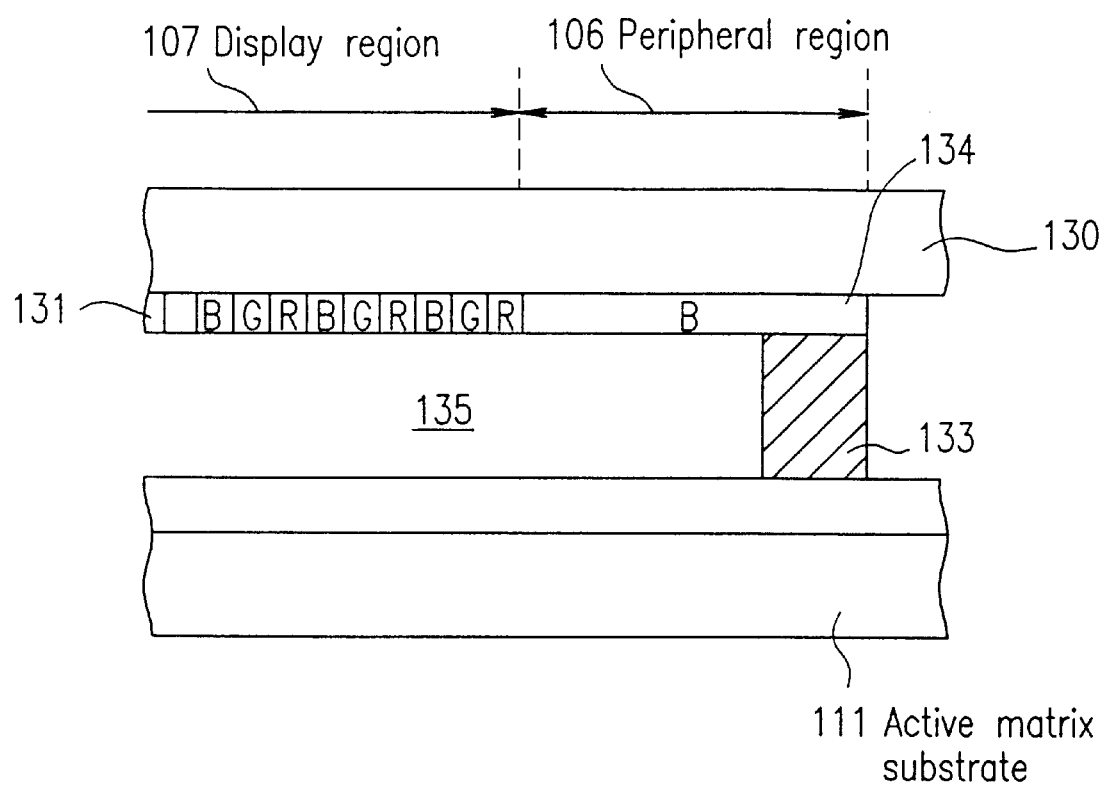
FIG. 14 is a cross-sectional view illustrating the essential portion of a liquid crystal display device according to Example 7 of the present invention.

FIG. 14 is a cross-sectional view illustrating the essential portion of a liquid crystal display device according to Example 7 of the present invention.

In the present example, instead of the light blocking layer 108 of Example 3, which is formed by depositing two layers of different colors, a single-layer light blocking layer 134 of a single color is provided in the same location as the light blocking layer 108 of Example 3. In particular, the B colored portion of the color filter is formed, as the light blocking layer 134, in a region on the color filter substrate that corresponds to the peripheral region. Other configurations of the present example are the same as those of Example 3.

Instead of the B colored portion, the R or G colored portions may also be employed. However, the B colored portion is advantageous in that it makes the peripheral region appear relatively dark.

It is possible to realize the similar effects as in Examples 4 to 6 by employing the configurations of Examples 4 to 6, respectively, with the single-layer single-color light blocking layer of the present example. In such a case, the single-layer single-color light blocking layer 134 of the present example provides the following advantages over the light blocking layer including two layers of different colors. One of the advantages is that the test for a sealing resin provided in the peripheral region can be easily conducted (the test is difficult to conduct when light is blocked by both the active matrix substrate and the color filter substrate). That is, since the light blocking layer 134 is a single-color single layer, the visibility through the device is slightly better.

Another advantage is that the disturbance in the orientation of the liquid crystal molecules due to the thickness variation can be suppressed owing to the reduced thickness of the light blocking layer 134. When the light blocking layer is formed by depositing two layers of different colors, due to the large thickness variation present between the peripheral region and the display region, the disturbance in the orientation of the liquid crystal molecules occurs more easily depending on the rubbing condition (particularly, the rubbing direction).

(EXAMPLE 8)

Figure 15:
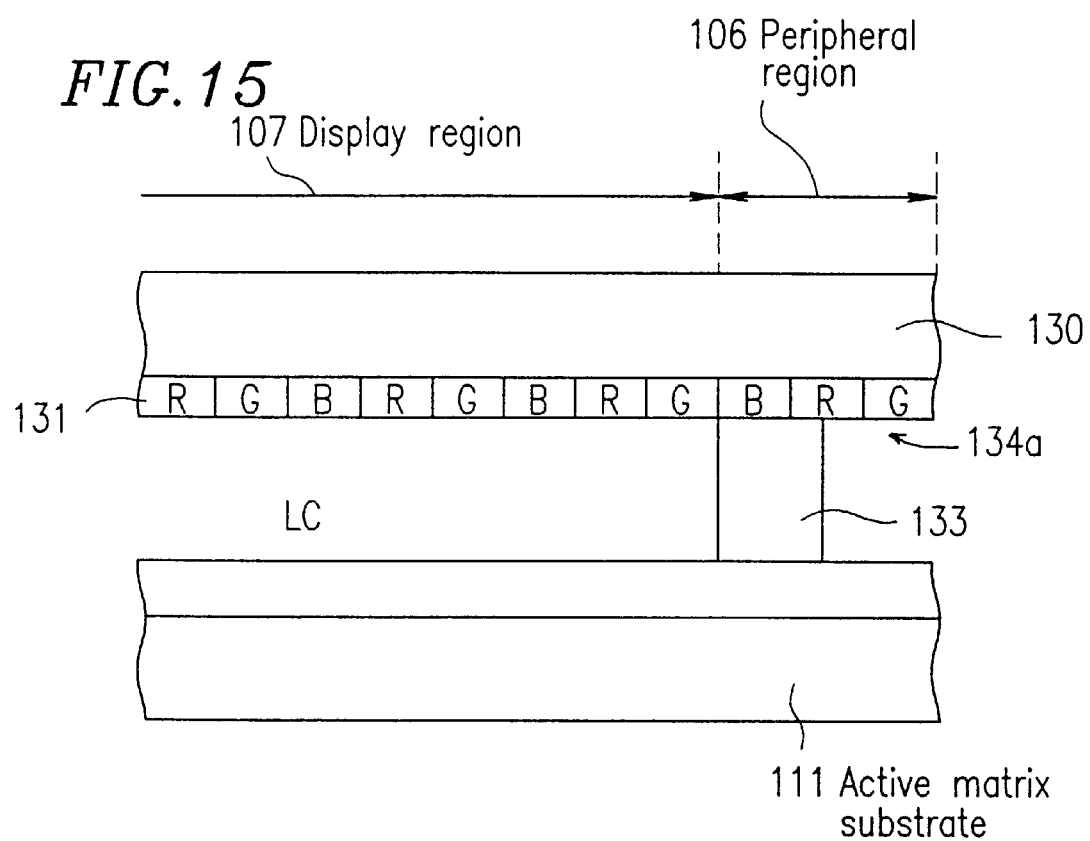
FIG. 15 is a cross-sectional view illustrating the essential portion of a liquid crystal display device according to Example 8 of the present invention.

FIG. 15 is a cross-sectional view illustrating the essential portion of a liquid crystal display device according to Example 8 of the present invention, which aims to solve the problems that occur when the light blocking layer is formed as a single layer.

In Example 7 described above, the entire single-layer light blocking layer 134 is formed of a single color, whereby light reflected in the peripheral region is viewed as being colored, thereby detracting from display quality.

Figure 16:
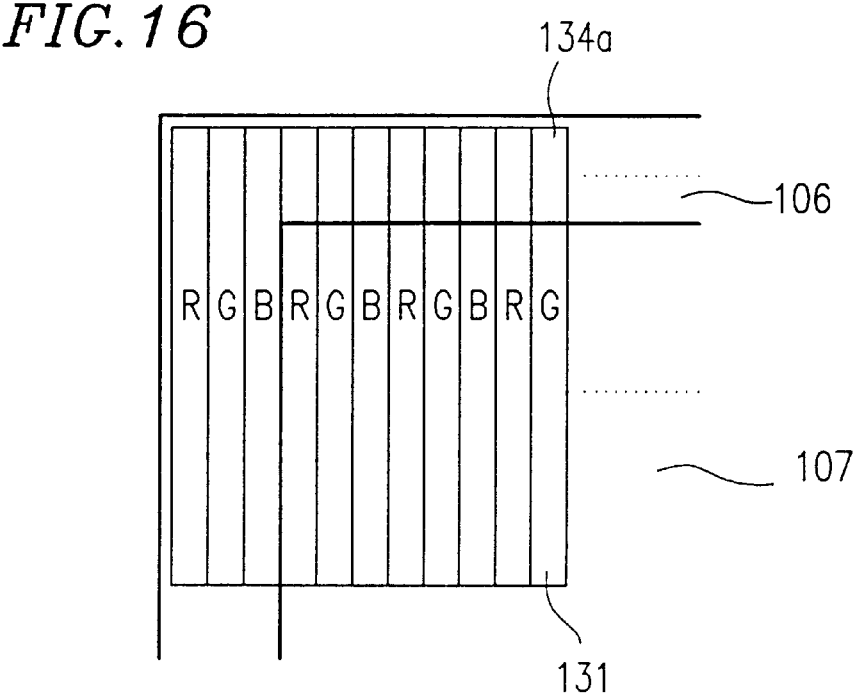
FIG. 16 is a plan view illustrating the essential portion of the liquid crystal display device according to Example 8 of the present invention.

In order to solve this problem, the single-layer light blocking layer 134*a* of the present example is formed by arranging colored portions of a plurality of different colors. In particular, as shown in FIG. 16, the light blocking layer 134*a* is formed in the peripheral region on the color filter substrate by extending the R, B and G colored portions, which are provided in the display region, to the peripheral region so that the R, B and G colored portions are arranged next to one another on the substrate 130.

When such a light blocking layer 134*a* is used in the liquid crystal display device, the light exiting from the liquid crystal device has a color that is obtained by mixing the three colors of the colored portions, thereby solving the above-noted problem. Moreover, there is no adverse effect due to the thickness variation which is present when the light blocking layer is formed of two layers of different colors.

(EXAMPLE 9)

Figure 17:
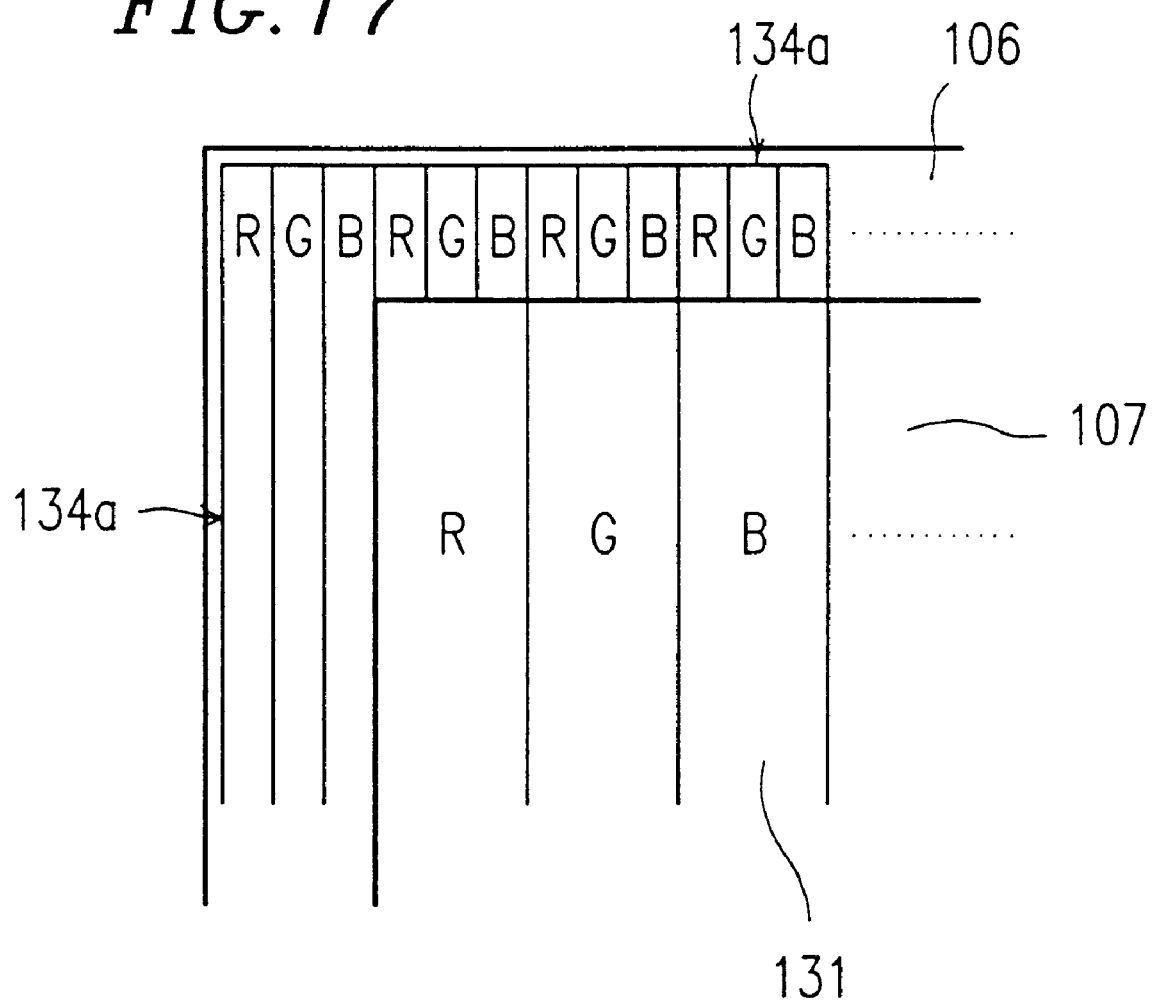
FIG. 17 is a plan view illustrating the essential portion of a liquid crystal display device according to Example 9 of the present invention.

FIG. 17 is a plan view illustrating the essential portion of a liquid crystal display device according to Example 9 of the present invention.

In Example 8 described above, the light blocking layer 134*a* is formed by extending the R, B and G colored portions, which are provided in the display region, to the peripheral region so that the R, B and G colored portions are arranged next to one another on the substrate 130. When this structure is applied to a high-precision liquid crystal display device whose color filter stripe width is small, different colors of the color filter are not recognized as different colors. However, when this structure is applied to a liquid crystal display device which is not so precisely designed, the different colors are recognized as different colors, thereby detracting from display quality.

In view of this, the color filter stripe is made narrower in the peripheral region than in the display region so that the different colors are not recognized as different colors. In particular, a stripe arrangement employed in 12.1" SVGA LCDs is employed, while the stripe width is set to be about 140 μm in the display region and about 45 μm in the peripheral region. When the color filter stripe width is sufficiently reduced in the peripheral region as described above, a liquid crystal display device of high quality can be realized. The stripe width of the color filter should be about 100 μm or less (more preferably, about 70 μm or less). When it is about 50 μm as in the present example, the different colors are not recognized as different colors. It should be noted that an excessively small stripe width provides no advantage, but only makes the patterning process difficult to conduct. However, when this technique is applied to a projection type liquid crystal display device, where images are displayed while being enlarged, the stripe width of the color filter should be made as small as possible.

Figure 18:
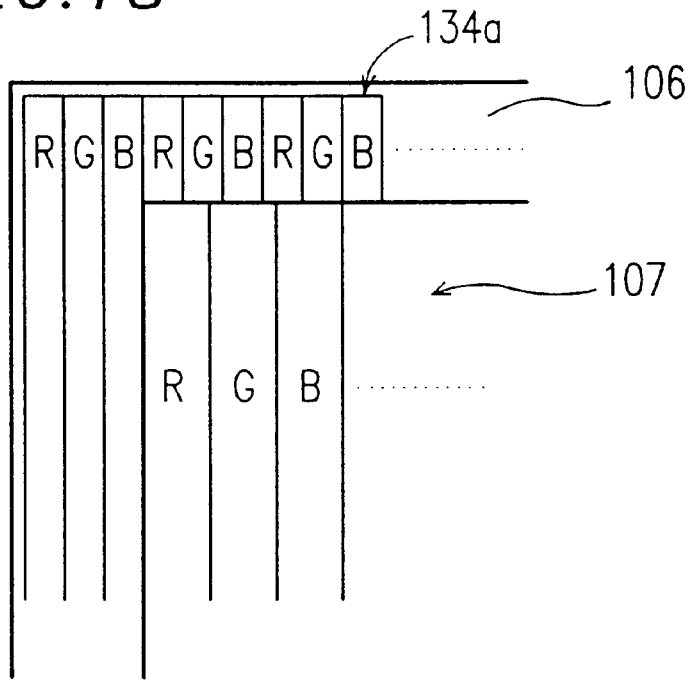
FIG. 18 is a plan view illustrating a liquid crystal display device having another configuration to which the present invention can be applied.
Figure 19:
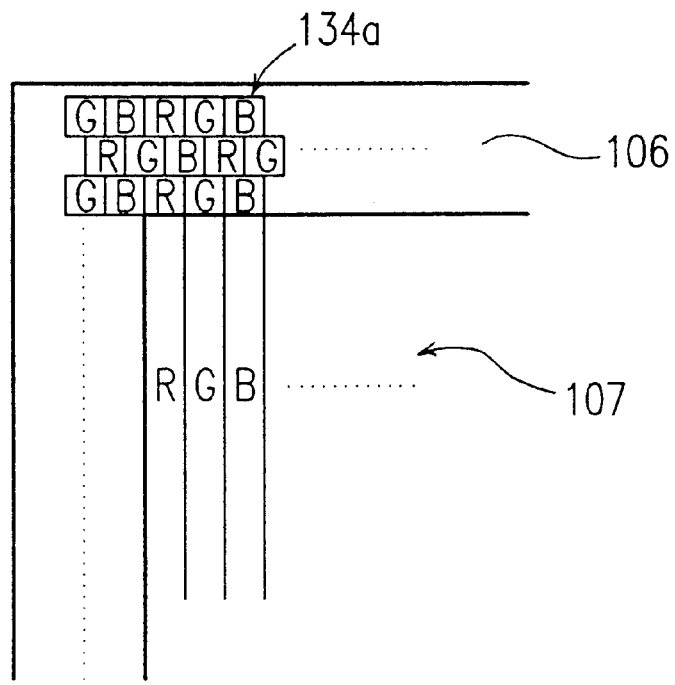
FIG. 19 is a plan view illustrating a liquid crystal display device having yet another configuration to which the present invention can be applied.
Figure 20:
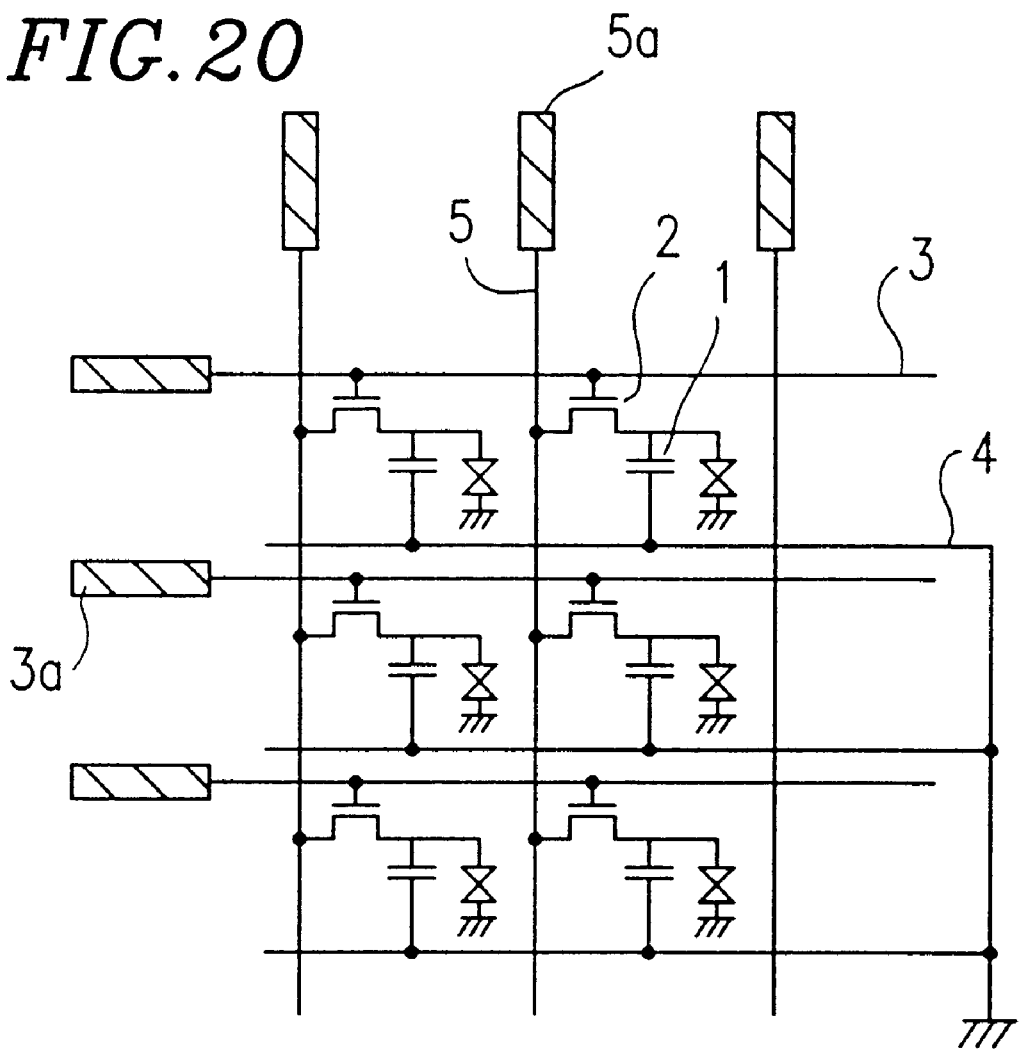
FIG. 20 is schematic diagram illustrating an exemplary configuration of an active matrix substrate.
Figure 21:
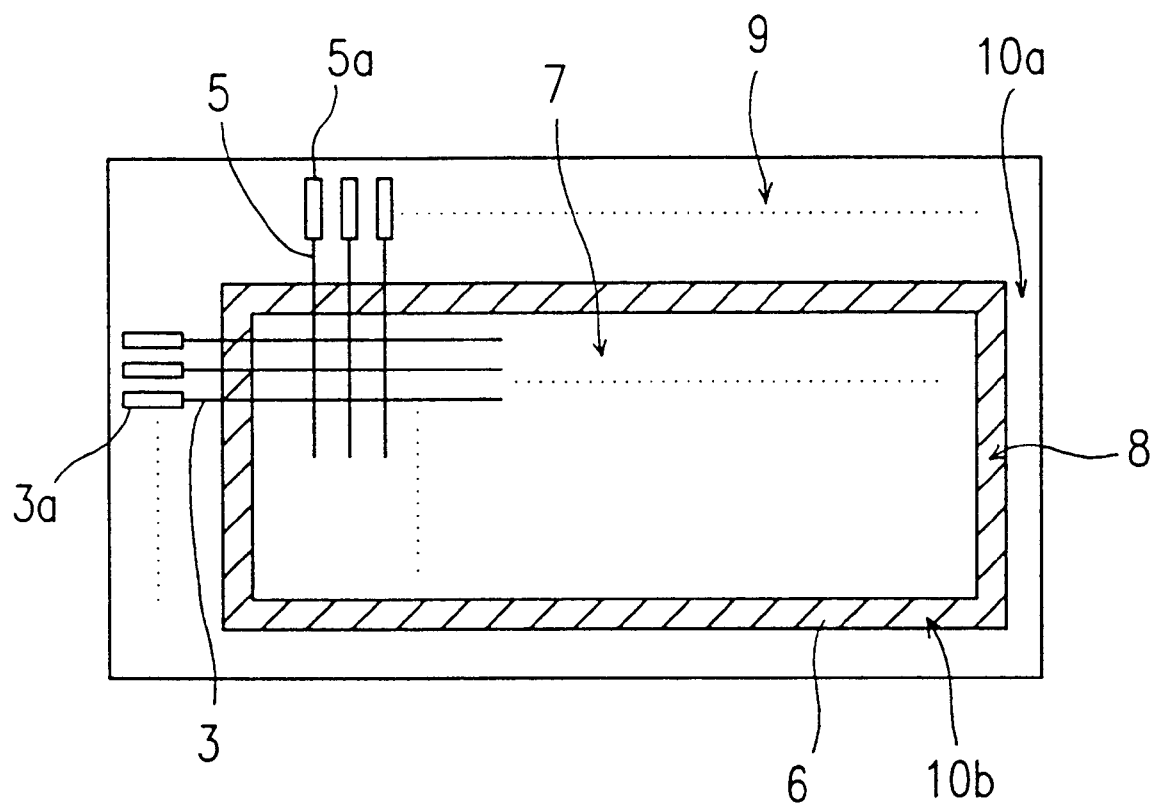
FIG. 21 is a plan view illustrating a conventional liquid crystal display device.

In Example 9, as shown in FIG. 18, the respective stripe width for the R, G and B colored portions in the peripheral region may be half of that in the display region. Moreover, the light blocking layer in the peripheral region does not have to be in the above-described stripe arrangement, but may also be in an oblique arrangement such as shown in FIG. 19, where the R, G and B colored portions are arranged in an oblique manner. Needless to say, the arrangement shown in FIG. 19 is not only applicable in Example 9, but also in Example 8 described above.

In the above-described Examples 7 to 9, the light blocking layer is formed of the materials used for the colored portions. However, the present invention is not limited thereto, but other colored portions (that each absorb light in a wavelength range different from that of any of the materials used for the colored portions of the color filter) may also be used for the light blocking layer.

Moreover, in each of the examples described above, the source line is formed in a double-layered structure including the metal layer and the ITO layer. However, it is also possible to form the source line as a single layer. Still, the double-layered structure is advantageous in that disconnection occurs less frequently since, even when there is some defect in a portion of the metal layer, electrical connection is maintained owing to the ITO layer.

Furthermore, although an active matrix type liquid crystal display device which employs TFTs as switching elements has been described in the above-described examples, it is, needless to say, possible to apply the present invention to other liquid crystal display devices which employ other types of switching elements (e.g., MIM (Metal Insulator Metal) elements).

Still furthermore, according to the present invention, the light blocking layer formed of the materials used for the colored portions may be provided so as to cover from the outermost portion of the display region to the sealing region for the attachment of the active matrix substrate to the color filter substrate. However, it is possible to leave uncovered the outermost portion of the display region or the sealing region. Still, it is preferable to provide the light blocking layer to cover the outermost portion of the display region so that light leaking through the boundary between the display region and the peripheral region can be blocked. Moreover, it is also preferable to provide the light blocking layer to cover the sealing region so as to make invisible to the viewer the sealing resin or the like, and the conductive paste or the like for allowing signal inputs to the counter substrate.

As is apparent from the above description, according to the present invention, the influence of ambient light on the display characteristics can be reduced by forming, on the counter substrate, the light blocking layer of one of the materials that are used for the colored portions of the color filter so as to cover the switching elements. Therefore, a high quality display can be realized without providing, on the counter substrate, the black matrix for covering the switching elements.

Particularly, when the light blocking layer is formed of the material that is used for the R (of the three colors: R, G and B) colored portion of the color filter, the influence of ambient light is considerably reduced, whereby a liquid crystal display device having satisfactory display characteristics can be realized.

Moreover, the influence of ambient light incident upon the switching elements is particularly significant when an amorphous silicon or a polycrystalline silicon is used for the semiconductor layer of the switching element, or when the semiconductor layer is formed on a portion of the scanning line or at the diverging point thereof. In such a case, the use of the above-described light blocking layer provides a more efficient blocking of ambient light.

Furthermore, when the pixel electrodes are provided on the interlayer insulating film which covers the gate lines, the source lines and the switching elements, there is no need for providing the black matrix for covering the boundaries between pixels. Therefore, even if the black matrix is not provided, there is no adverse influence on the display, whereby a highly satisfactory display can be realized.

As described above, in the liquid crystal display device of the present invention, the influence of ambient light on the display characteristics can be reduced so that a satisfactory display can be realized with no black matrix. As a result, the number of production steps can be reduced, and thus the cost of production can also be reduced.

As is apparent from the above description, according to the present invention, light leaking through the peripheral region can be blocked without providing the black matrix in the peripheral region on the color filter substrate. The light blocking layer may be formed as a single layer of a single color or as a multilayer structure including two layers of different colors. Moreover, the formation of the light blocking layer can be conducted simultaneously during the production step of patterning the colored portions of the color filter. As a result, the black matrix formation process can be eliminated from the production of the liquid crystal display device, thereby reducing the cost of production. Particularly, when the light blocking layer is formed as a single layer of a single color, a test for a sealing resin provided in the peripheral region can be easily conducted, while disturbance in the orientation of the liquid crystal molecules can be suppressed. When the single-layer light blocking layer includes a plurality of colored portions of different colors, coloring of light through the light blocking layer can be prevented from occurring.

Furthermore, when the second light blocking layer is provided in the peripheral region on the active matrix substrate, the light transmission through the peripheral region can be further lowered, thereby improving the display quality.

Still furthermore, the second light blocking layer does not make the production process any more complicated since it can be formed simultaneously with the scanning lines or the signal lines. In such a case, if the light blocking layer is provided so as to cover the interspace between the outermost scanning line in the display region and the second light blocking layer and the interspace between the outermost signal line in the display region and the second light blocking layer, light leaking therethrough can also be blocked, thereby further improving the display quality.

The second light blocking layer may be formed in a separate layer from the scanning lines and the signal lines. In such a case, the number of production steps to be performed increases. However, for example, if the second light blocking layer is formed on a thick layer such as an interlayer insulating film, the capacitance between the second light blocking layer and the respective lines can be reduced. Moreover, by providing the second light blocking layer so as to cover two or more of the scanning lines and/or the signal lines, the line arrangement's pattern can be made unrecognizable, thereby further improving the display quality.

When the light blocking layer is formed of the materials that are respectively used for red and blue colored portions, the light transmission through the peripheral region can be made minimal, whereby a liquid crystal display device of a considerably high display quality can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
   first and second substrates opposing each other;
   a liquid crystal layer interposed between the first and second substrates;
   a plurality of scanning lines and a plurality of signal lines formed on the first substrate so as to cross each other, the scanning lines and the signal lines defining a plurality of pixel regions arranged in a matrix;
   a plurality of switching elements each provided in one of the pixel regions in a vicinity of an intersection of the scanning lines and the signal lines;
   a color filter provided on the second substrate, the color filter including a plurality of colored portions each portion being formed of a material; and
   a light blocking layer provide on the second substrate, the light blocking layer being formed of two or less of said materials that are used for the plurality of colored portions.

2. A liquid crystal display device according to claim 1, wherein:
   each of the pixel regions corresponds to one of the plurality of colored portions;
   the light blocking layer is provided so as to face the switching element in each of the pixel regions; and
   in a remaining portion of each of the pixel regions, a corresponding one of the colored portions is provided.

3. A liquid crystal display device according to claim 1, wherein:
   the color filter includes red, blue and green colored portions; and
   the light blocking layer is formed of a material that is used for the red colored portions.

4. A liquid crystal display device according to claim 1, wherein the light blocking layer is formed in a peripheral region surrounding a display region which includes the plurality of pixel regions.

5. A liquid crystal display device according to claim 4, wherein the light blocking layer is formed by depositing two layers respectively using two of the materials used for the plurality of colored portions of the color filter.

6. A liquid crystal display device according to claim 4, wherein the plurality of colored portions provided on the second substrate are extended from the display region to the peripheral region so as to be included in the light blocking layer and the light blocking layer includes the plurality of colored portions arranged to be next to one another in a single plane in the peripheral region.

7. A liquid crystal display device according to claim 6, wherein each of the plurality of colored portions is narrower in the peripheral region than in the display region.

8. A liquid crystal display device according to claim 4 further comprising a second light blocking layer formed in the peripheral region, wherein
   the second light blocking layer is provided so as to cover a region between any two adjoining scanning lines.

9. A liquid crystal display device according to claim 8, wherein the second light blocking layer and the signal lines are formed by patterning one layer.

10. A liquid crystal display device according to claim 8 further comprising a second light blocking layer formed in the peripheral region, wherein
    the second light blocking layer is provided so as to cover a region between any two adjoining signal lines.

11. A liquid crystal display device according to claim 10, wherein the second light blocking layer and the scanning lines are formed by patterning one layer.

12. A liquid crystal display device according to claim 4 further comprising a second light blocking layer formed in the peripheral region, wherein:
    the second light blocking layer is provided so as to be spaced apart from an outermost one of the scanning lines; and
    the light blocking layer is provided in a region corresponding to an interspace between the second light blocking layer and the outermost scanning line.

13. A liquid crystal display device according to claim 4 further comprising a second light blocking layer formed in the peripheral region, wherein:
    the second light blocking layer is provided so as to be spaced apart from an outermost one of the signal lines; and
    the light blocking layer is provided in a region corresponding to an interspace between the second light blocking layer and the outermost signal line.

14. A liquid crystal display device according to claim 1, wherein:
    an insulating film is provided on the first substrate so as to cover the scanning lines and the signal lines;
    a second light blocking layer is provided in a region corresponding to a peripheral region of the first substrate;
    the second light blocking layer covers two or more of the scanning lines and/or two or more of the signal lines; and
    the second light blocking layer is provided over the lines to be covered via the insulating film therebetween.

15. A liquid crystal display device according to claim 1, wherein each of the switching elements includes an amorphous silicon layer or a polycrystalline silicon layer.

16. A liquid crystal display device according to claim 1, wherein:
each of the switching elements is a thin film transistor including a gate electrode, an insulating film formed on the gate electrode, and a semiconductor film formed on the insulating film so as to be located above the gate electrode; and
a portion of a corresponding scanning line functions as the gate electrode.

17. A liquid crystal display device according to claim 1, wherein:
each of the switching elements is a thin film transistor including a gate electrode, an insulating film formed on the gate electrode, and a semiconductor film formed on the insulating film so as to be located above the gate electrode; and
a branching portion of a corresponding scanning line functions as the gate electrode.

18. A liquid crystal display device according to claim 1 further comprising an interlayer insulating film provided on the first substrate so as to cover the scanning lines, the signal lines and the switching elements, with a plurality of pixel electrodes being formed on the interlayer insulating film; and
the plurality of pixel electrodes are arranged to respectively correspond to the plurality of pixel regions, each pixel of the electrodes being connected to the switching element formed in corresponding one of the pixel regions via a contact hole provided in the interlayer insulating film.

19. A liquid crystal display device according to claim 1, wherein the light blocking layer is formed of one of the materials that are used for the plurality of colored portions.

20. A liquid crystal display device according to claim 1, wherein the color filter includes red, blue and green colored portions, and the light blocking layer includes a layer of a material that is used for the colored portions.

21. A liquid crystal display device comprising:
first and second substrates opposing each other;
a liquid crystal layer interposed between the first and second substrates;
a plurality of scanning lines and a plurality of signal lines formed on the first substrate so as to cross each other, the scanning lines and the signal lines defining a plurality of pixel regions arranged in a matrix;
a plurality of switching elements each provided in one of the pixel regions in a vicinity of an intersection of the scanning lines and the signal lines;
a color filter provided on the second substrate, the color filter including a plurality of colored portions each portion being formed of a material; and
a light blocking layer provided on the second substrate, the light blocking layer being formed of two or less of said materials that are used for the plurality of colored portions,
wherein:
each of the pixel regions corresponds to one of the plurality of colored portions;
the light blocking layer is provided so as to face the switching element in each of the pixel regions;
in a remaining portion of each of the pixel regions, a corresponding one of the colored portions is provided;
the color filter includes red, blue and green colored portions;
the light blocking layer is formed of a material that is used for the red colored portions; and
the light blocking layer is formed in a peripheral region surrounding a display region which includes the plurality of pixel regions.

22. A liquid crystal display device according to claim 21, wherein the light blocking layer is formed by depositing two layers respectively using two of the materials used for the plurality of colored portions of the color filter.

23. A liquid crystal display device according to claim 21, wherein the plurality of colored portions provided on the second substrate are extended from the display region to the peripheral region so as to be included in the light blocking layer and the light blocking layer includes the plurality of colored portions arranged to be next to one another in a single plane in the peripheral region.

24. A liquid crystal display device according to claim 23, wherein each of the plurality of colored portions is narrower in the peripheral region than in the display region.

25. A liquid crystal display device according to claim 21, further comprising a second light blocking layer formed in the peripheral region, wherein
the second light blocking layer is provided so as to cover a region between any two adjoining scanning lines.

26. A liquid crystal display device according to claim 25, wherein the second light blocking layer and the signal lines are formed by patterning one layer.

27. A liquid crystal display device according to claim 25, further comprising a second light blocking layer formed in the peripheral region, wherein
the second light blocking layer is provided so as to cover a region between any two adjoining signal lines.

28. A liquid crystal display device according to claim 27, wherein the second light blocking layer and the scanning lines are formed by patterning one layer.

29. A liquid crystal display device according to claim 21, further comprising a second light blocking layer formed in the peripheral region, wherein:
the second light blocking layer is provided so as to be spaced apart from an outermost one of the scanning lines; and
the light blocking layer is provided in a region corresponding to an interspace between the second light blocking layer and the outermost scanning line.

30. A liquid crystal display device according to claim 21, further comprising a second light blocking layer formed in the peripheral region, wherein:
the second light blocking layer is provided so as to be spaced apart from an outermost one of the signal lines; and
the light blocking layer is provided in a region corresponding to an interspace between the second light blocking layer and the outermost signal line.

31. A liquid crystal display device according to claim 21, wherein:
an insulating film is provided on the first substrate so as to cover the scanning lines and the signal lines;
a second light blocking layer is provided in a region corresponding to a peripheral region of the first substrate;
the second light blocking layer covers two or more of the scanning lines and/or two or more of the signal lines; and
the second light blocking layer is provided over the lines to be covered via the insulating film therebetween.

* * * * *